United States Patent
Xiong et al.

(10) Patent No.: US 10,624,156 B2
(45) Date of Patent: Apr. 14, 2020

(54) 5G FDD LOW LATENCY TRANSMISSION SUBFRAME STRUCTURE SYSTEM AND METHOD OF USE

(71) Applicant: Intel IP Corporation, Santa Clara, CA (US)

(72) Inventors: Gang Xiong, Beaverton, OR (US);
Glenn J. Bradford, Hillsboro, OR (US); Yushu Zhang, Beijing (CN);
Jong-Kae Fwu, Sunnyvale, CA (US);
Yuan Zhu, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/069,819

(22) PCT Filed: May 31, 2016

(86) PCT No.: PCT/US2016/035037
§ 371 (c)(1),
(2) Date: Jul. 12, 2018

(87) PCT Pub. No.: WO2017/123276
PCT Pub. Date: Jul. 20, 2017

(65) Prior Publication Data
US 2019/0037640 A1    Jan. 31, 2019

Related U.S. Application Data

(60) Provisional application No. 62/279,568, filed on Jan. 15, 2016.

(51) Int. Cl.
*H04L 12/28* (2006.01)
*H04W 88/06* (2009.01)
(Continued)

(52) U.S. Cl.
CPC .......... *H04W 88/06* (2013.01); *H04B 7/0626* (2013.01); *H04L 1/1812* (2013.01);
(Continued)

(58) Field of Classification Search
CPC ...................................................... H04L 12/28
(Continued)

(56) References Cited

U.S. PATENT DOCUMENTS

| 2013/0114525 A1 | 5/2013 | Ahmadi et al. |
| 2014/0071954 A1 | 3/2014 | Au et al. |
| 2018/0279357 A1* | 9/2018 | Zacharias ............. H04W 76/28 |

FOREIGN PATENT DOCUMENTS

TW        201735576 A      10/2017

OTHER PUBLICATIONS

"International Application Serial No. PCT/US2016/035037, International Search Report dated Sep. 12, 2016", 3 pgs.
(Continued)

*Primary Examiner* — Dang T Ton
(74) *Attorney, Agent, or Firm* — Kowert, Hood, Munyon, Rankin & Goetzel, P.C.

(57) ABSTRACT

Devices for and methods of providing low latency 5G FDD communications are generally described. A HARQ ACK/NACK for an xPDSCH is transmitted in the xPUCCH of the same or next subframe as the xPDSCH and xPDCCH. An xPUSCH is generated in the same subframe in response to an xPDCCH and HARQ ACK/NACK response is carried by another xPDCCH or xPHICH in the same or next subframe. The xPDCCH and the xPUCCH are at opposite ends of the same subframe, DL and UL subframe are delayed relative to each other, or at least one of the DL and UL subframe has an additional blank portion, portion with data associated with another UE or portion that contains a reference signal, broadcast signal or control information.

19 Claims, 13 Drawing Sheets

(51) Int. Cl.
*H04L 1/18* (2006.01)
*H04L 5/00* (2006.01)
*H04W 76/27* (2018.01)
*H04B 7/06* (2006.01)
*H04L 5/14* (2006.01)
*H04W 72/04* (2009.01)
*H04B 7/0413* (2017.01)

(52) U.S. Cl.
CPC .............. *H04L 1/1861* (2013.01); *H04L 5/00* (2013.01); *H04L 5/0055* (2013.01); *H04L 5/14* (2013.01); *H04W 72/042* (2013.01); *H04W 72/0446* (2013.01); *H04W 76/27* (2018.02); *H04B 7/0413* (2013.01)

(58) Field of Classification Search
USPC ........................................................ 370/329
See application file for complete search history.

(56) References Cited

OTHER PUBLICATIONS

"International Application Serial No. PCT/US2016/035037, Written Opinion dated Sep. 12, 2016", 10 pgs.

"On physical layer aspects of low latency", Qualcomm Incorporated, R1-157082, 3GPP TSG RAN WG1 #83, Anaheim, USA, (Nov. 7, 2015).

Huawei, et al., "Control signaling enhancements for short TTI", R1-156461, 3GPP TSG RAN WG1 Meeting #83, Anaheim, USA (Nov. 7, 2015).

Huawei, et al., "Views on TTI length", R1-156459, 3GPP TSG RAN WG1 Meeting #83, Anaheim, USA, (Nov. 7, 2015).

\* cited by examiner

5G FDD LOW LATENCY TRANSMISSION SUBFRAME STRUCTURE SYSTEM AND METHOD OF USE

PRIORITY CLAIM

This application is a U.S. National Stage Filing under 35 U.S.C. 371 from International Application No. PCT/US2016/035037, filed Mar. 31, 2016 and published in English as WO 2017/123276 on Jul. 20, 2017, which claims the benefit of priority to U.S. Provisional Patent Application Ser. No. 62/279,568, filed Jan. 15, 2016, and entitled "SUBFRAME STRUCTURE TO ENABLE LOW LATENCY TRANSMISSION FOR 5G FDD SYSTEM," each of which is incorporated herein by reference in its entirety.

TECHNICAL FIELD

Embodiments pertain to radio access networks. Some embodiments relate to providing data in cellular and wireless local area network (WLAN) networks, including Third Generation Partnership Project Long Term Evolution (3GPP LIE) networks and LTE advanced (LTE-A) networks as well as $4^{th}$ generation (4G) networks and $5^{th}$ generation (5G) networks. Some embodiments relate to Frequency Division Duplexing (FDD) in 5G networks.

BACKGROUND

The use of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. As a result, 3GPP LTE systems continue to develop, with the next generation wireless communication system, 5G, to improve access to information and data sharing. 5G looks to provide a unified network/system that is able to meet vastly different and sometime conflicting performance dimensions and services driven by disparate services and applications while maintaining compatibility with legacy UEs and applications. 5G systems may be designed to increase available UE data rates to a peak data rate exceeding 10 Gps, support a massive number of machine type communication (MTC) UEs, and support low latency communications.

The increased number and types of UEs may be conducive to maximum flexibility for subframe design. In particular, when FDD is used for communication in a 5G system, it may be desirable for 5G subframes with a flexible structure to be used or particular 5G subframe structures to be used to reduce latency for ultra-reliable or mission critical applications.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
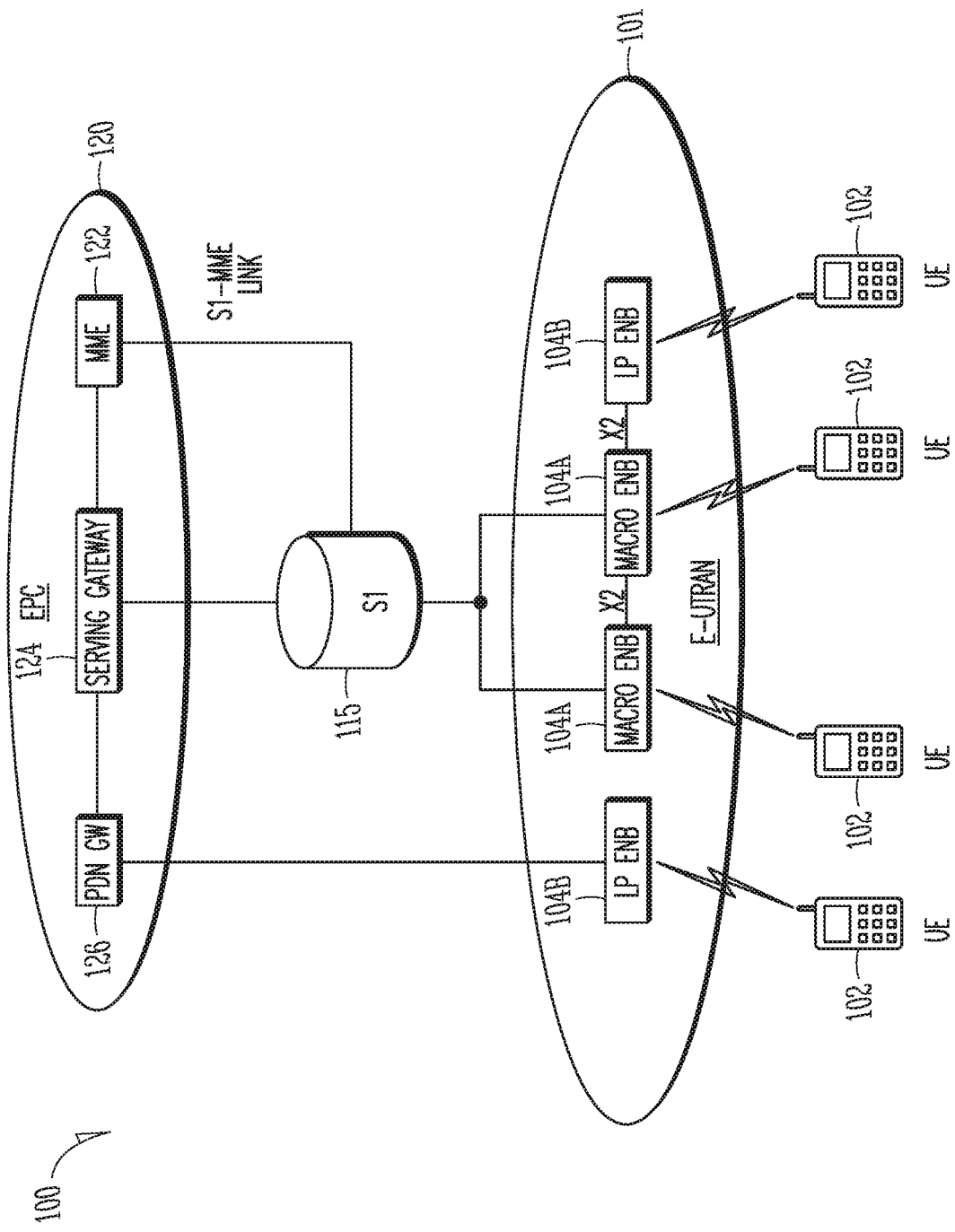
FIG. 1 is a functional diagram of a wireless network in accordance with some embodiments.

FIG. 1 shows an example of a portion of an end-to-end network architecture of a Long Term Evolution (LTE) network with various components of the network in accordance with some embodiments. As used herein, an LTE network refers to both LTE and LTE Advanced (LTE-A) networks as well as other versions of LTE networks in development, such as 4G and 5G LTE networks. The network 100 may comprise a radio access network (RAN) (e.g., as depicted, the E-UTRAN or evolved universal terrestrial radio access network) 101 and core network 120 (e.g., shown as an evolved packet core (EPC)) coupled together through an S1 interface 115. For convenience and brevity, only a portion of the core network 120, as well as the RAN 101, is shown in the example.

The core network 120 may include a mobility management entity (MME) 122, serving gateway (serving GW) 124, and packet data network gateway (PDN GW) 126. The RAN 101 may include evolved node Bs (eNBs) 104 (which may operate as base stations) for communicating with user equipment (UE) 102. The eNBs 104 may include macro eNBs 104a and low power (LP) eNBs 104b. The eNBs 104 and UEs 102 may employ the techniques as described herein.

The MME 122 may be similar in function to the control plane of legacy Serving GPRS Support Nodes (SGSN). The MME 122 may manage mobility aspects in access such as gateway selection and tracking area list management. The serving GW 124 may terminate the interface toward the RAN 101, and route data packets between the RAN 101 and the core network 120. In addition, the serving GW 124 may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes.

The PDN GW 126 may terminate a SGi interface toward the packet data network (PDN). The PDN GW 126 may route data packets between the EPC 120 and the external PDN, and may perform policy enforcement and charging data collection. The PDN GW 126 may also provide an anchor point for mobility devices with non-LTE access. The external PDN can be any kind of IP network, as well as an IP Multimedia Subsystem (IMS) domain. The PDN GW 126 and the serving GW 124 may be implemented in a single physical node or separate physical nodes.

The eNBs 104 (macro and micro) may terminate the air interface protocol and may be the first point of contact for a UE 102. In some embodiments, an eNB 104 may fulfill various logical functions for the RAN 101 including, but not limited to, RNC (radio network controller functions) such as radio bearer management, uplink and downlink dynamic radio resource management and data packet scheduling, and mobility management. In accordance with embodiments, UEs 102 may be configured to communicate orthogonal frequency division multiplexed (OFDM) communication signals with an eNB 104 over a multicarrier communication channel in accordance with an OFDMA communication technique. The OFDM signals may comprise a plurality of orthogonal subcarriers.

The S1 interface 115 may be the interface that separates the RAN 101 and the EPC 120. It may be split into two parts: the S1-U, which may carry traffic data between the eNBs 104 and the serving GW 124, and the S1-MME, which may be a signaling interface between the eNBs 104 and the MME 122. The X2 interface may be the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP cells 104b may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, or may operate on different frequency bands with each cell operating in a different frequency band or only cells of different sizes operating on different frequency bands. As used herein, term LP eNB refers to any suitable relatively LP eNB for implementing a smaller cell (smaller than a macro cell) such as a femtocell, a picocell, or a microcell. Femtocell eNBs may be typically provided by a mobile network operator to its residential or enterprise customers. A femtocell may be typically the size of a residential gateway or smaller and generally connect to a broadband line. The femtocell may connect to the mobile operator's mobile network and provide extra coverage in a range of typically 30 to 50 meters. Thus, a LP eNB 104b might be a femtocell eNB since it is coupled through the PDN GW 126. Similarly, a picocell may be a wireless communication system typically covering a small area, such as in-building (offices, shopping malls, train stations, etc.), or more recently in-aircraft. A picocell eNB may generally connect through its X2 link to another eNB such as a macro eNB through its base station controller (BSC) functionality. Thus, LP eNB may be implemented with a picocell eNB since it may be coupled to a macro eNB 104a via an X2 interface. Picocell eNBs or other LP eNBs LP eNB 104b may incorporate some or all functionality of a macro eNB LP eNB 104a. In some cases, this may be referred to as an access point base station or enterprise femtocell.

Communication over an LTE network may be split up into 10 ms radio frames, each of which may contain ten 1 ms subframes. Each subframe of the frame, in turn, may contain two slots of 0.5 ms. Each subframe may be used for uplink (UL) communications from the UE 102 to the eNB 104 or downlink (DL) communications from the eNB 104 to the UE. In one embodiment, the eNB 104 may allocate a greater number of DL communications than UL communications in a particular frame. The eNB 104 may schedule transmissions over a variety of frequency bands. Each slot of the subframe may contain 6-7 OFDM symbols, depending on the system used. In one embodiment, each subframe may contain 12 subcarriers. In the 5G system, however, the frame size (ms), the subframe size and number of subframes within a frame, as well as the frame structure, may be different from that of a 4G or LTE system. The subframe size, as well as number of subframes in a frame, may also vary in the 5G system from frame to frame. For example, while the frame size may remain at 10 ms in the 5G system for downward compatibility, the subframe size may be decreased to 0.2 ms or 0.25 ms to increase the number of subframes in each frame.

A downlink resource grid may be used for downlink transmissions from an eNB 104 to a UE 102, while an uplink resource grid may be used for uplink transmissions from a UE 102 to an eNB 104 or from a UE 102 to another UE 102. The resource grid may be a time-frequency grid, which is the physical resource in the downlink in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE. A RB in some embodiments may be 180 kHz wide in frequency and 1 slot long in time. In frequency, RBs may be either 12×15 kHz subcarriers or 24×7.5 kHz subcarriers wide, dependent on the system bandwidth. In Frequency Division Duplexing (FDD) systems, both the uplink and downlink frames may be 10 ms and frequency (full-duplex) or time (half-duplex) separated. The duration of the resource grid 400 in the time domain corresponds to one subframe or two resource blocks. Each resource grid may comprise 12 (subcarriers)*14 (symbols)= 168 resource elements.

Each OFDM symbol may contain a cyclic prefix (CP) which may be used to effectively eliminate Inter Symbol Interference (ISI), and a Fast Fourier Transform (FFT) period. The duration of the CP may be determined by the highest anticipated degree of delay spread. Although distortion from the preceding OFDM symbol may exist within the CP, with a CP of sufficient duration, preceding OFDM symbols do not enter the FFT period. Once the FFT period signal is received and digitized, the receiver may ignore the signal in the CP.

There may be several different physical downlink channels that are conveyed using such resource blocks, including the physical downlink control channel (PDCCH) and the physical downlink shared channel (PDSCH). Each downlink subframe may be partitioned into the PDCCH and the PDSCH. The PDCCH may normally occupy the first two symbols of each subframe and carry, among other things, information about the transport format and resource allocations related to the PDSCH channel, as well as H-ARQ information related to the uplink shared channel. The PDSCH may carry user data and higher layer signaling to a UE and occupy the remainder of the subframe. Typically, downlink scheduling (assigning control and shared channel resource blocks to UEs within a cell) may be performed at the eNB based on channel quality information provided from the UEs to the eNB, and then the downlink resource assignment information may be sent to each UE on the PDCCH used for (assigned to) the UE. The PDCCH may contain downlink control information (DCI) in one of a number of formats that indicate to the UE how to find and decode data, transmitted on PDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the UE-specific RNTI may limit decoding of the DCI format (and hence the corresponding PDSCH) to only the intended UE.

In order to enable retransmission of missing or erroneous data, the Hybrid Automatic Repeat Request (HARQ) scheme may be used to provide the feedback on success or failure of a decoding attempt to the transmitter after each received data block. When an eNB 104 sends data to the UE 102 in a PDSCH (or 5G PDSCH, referred to as an xPDSCH), the data packets may be sent together with indicators in a PDCCH in the same subframe that inform the UE 102 about the scheduling of the PDSCH, including the transmission time and other scheduling information of the transmitted data. For each PDSCH codeword that the UE 102 receives, the UE 102 may respond with an ACK when the codeword is successfully decoded, or a NACK when the codeword is not successfully decoded. The eNB 104 may expect the ACK/NACK feedback a predetermined time after the PDSCH data is sent. Upon receiving a NACK from the UE 102, the eNB 104 may retransmit the transport block or skip the retransmission if the retransmission number exceeds a maximum value. The ACK/NACK for a corresponding the PDSCH in an LTE system may be transmitted by the UE four subframes after the PDSCH is received from the eNB 104 to permit the UE 102 sufficient time to attempt to decode the PDSCH. Depending on the number of codewords present, HARQ-ACK information corresponding to a PDSCH may contain, for example, 1 or 2 information bits (DCI formats 1a and 1b, respectively). The HARQ-ACK bits may then be processed, as per the PUCCH.

Figure 2:
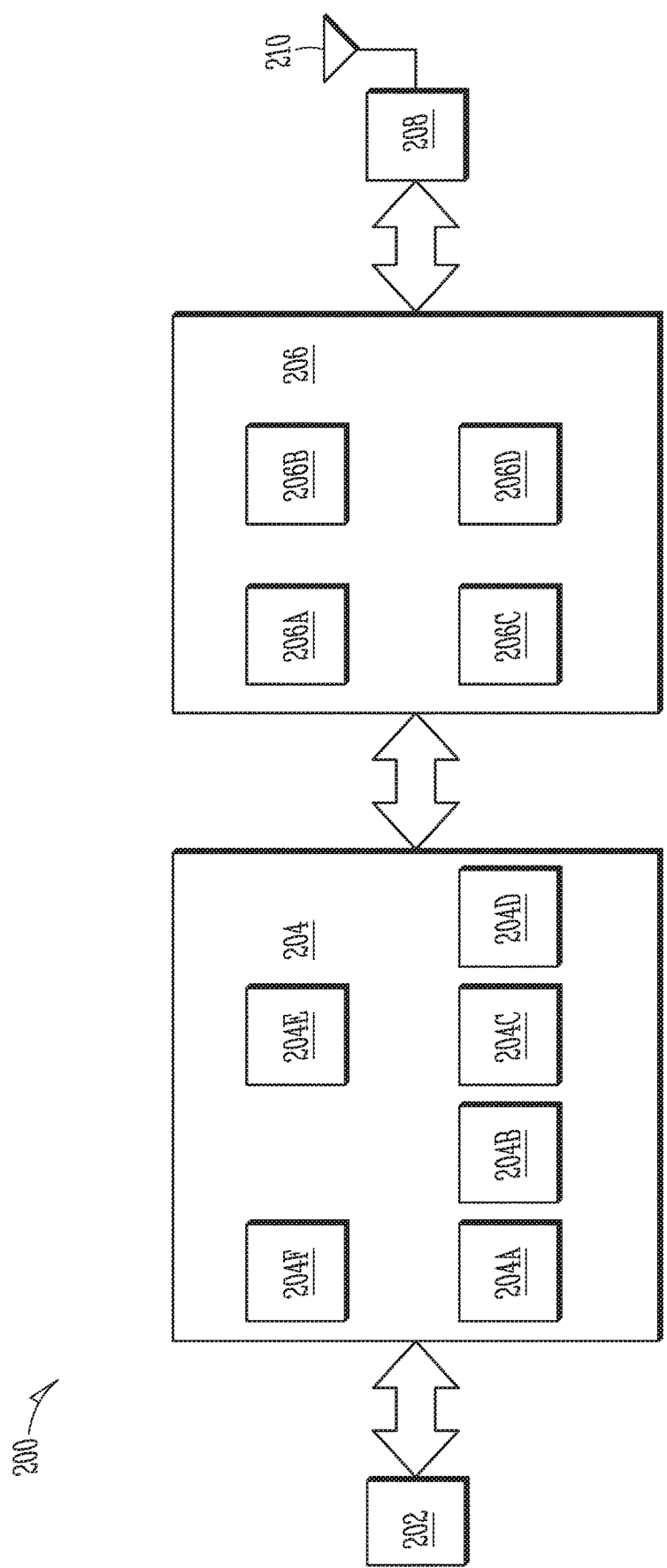
FIG. 2 illustrates components of a communication device in accordance with some embodiments.

Embodiments described herein may be implemented into a system using any suitably configured hardware and/or software. FIG. 2 illustrates components of a UE in accordance with some embodiments. At least some of the components shown may be used in the UE 102 (or eNB 104) shown in FIG. 1. The UE 200 and other components may be configured to use the synchronization signals as described herein. The UE 200 may be one of the UEs 102 shown in FIG. 1 and may be a stationary, non-mobile device or may be a mobile device. In some embodiments, the UE 200 may include application circuitry 202, baseband circuitry 204, Radio Frequency (RF) circuitry 206, front-end module (FEM) circuitry 208 and one or more antennas 210, coupled together at least as shown. At least some of the baseband circuitry 204, RF circuitry 206, and FEM circuitry 208 may form a transceiver. In some embodiments, other network elements, such as the eNB may contain some or all of the components shown in FIG. 2. Other of the network elements, such as the MME, may contain an interface, such as the S1 interface, to communicate with the eNB over a wired connection regarding the UE.

The application or processing circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuity 204 may interface with the application circuitry 202 for generation and processing of the baseband signals and for controlling operations of the RF circuitry 206. For example, in some embodiments, the baseband circuitry 204 may include a second generation (2G) baseband processor 204a, third generation (3G) baseband processor 204b, fourth generation (4G) baseband processor 204c, and/or other baseband processor(s) 204d for other existing generations, generations in development or to be developed in the future (e.g., fifth generation (5G), 5G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include FFT, precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access network (EUTRAN) protocol including, for example, physical (PRY), media access control (MAC), radio link control (RLC), packet data convergence protocol (PDCP), and/or radio resource control (RRC) elements. A central processing unit (CPU) 204e of the baseband circuitry 204 may be configured to run elements of the protocol stack for signaling of the PHY, MAC, RLC, PDCP and/or RRC layers. In some embodiments, the baseband circuitry may include one or more audio digital signal processor(s) (DSP) 204*f*. The audio DSP(s) 204*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry. In some embodiments, the device can be configured to operate in accordance with communication standards or other protocols or standards, including Institute of Electrical and Electronic Engineers (IEEE) 802.16 wireless technology (WiMax), IEEE 802.11 wireless technology (WiFi) including IEEE 802.11 ad, which operates in the 60 GHz millimeter wave spectrum, various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206*a*, amplifier circuitry 206*b* and filter circuitry 206*c*. The transmit signal path of the RF circuitry 206 may include filter circuitry 206*c* and mixer circuitry 206*a*. RF circuitry 206 may also include synthesizer circuitry 206*d* for synthesizing a frequency for use by the mixer circuitry 206*a* of the receive signal path and the transmit signal path. In some embodiments, the mixer circuitry 206*a* of the receive signal path may be configured to down-convert RF signals received from the FEM circuitry 208 based on the synthesized frequency provided by synthesizer circuitry 206*d*. The amplifier circuitry 206*b* may be configured to amplify the down-converted signals and the filter circuitry 206*c* may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206*a* of the receive signal path may comprise passive mixers, although the scope of the embodiments is not limited in this respect.

In some embodiments, the mixer circuitry 206*a* of the transmit signal path may be configured to up-convert input baseband signals based on the synthesized frequency provided by the synthesizer circuitry 206*d* to generate RF output signals for the FEM circuitry 208. The baseband signals may be provided by the baseband circuitry 204 and may be filtered by filter circuitry 206*c*. The filter circuitry 206*c* may include a low-pass filter (LPF), although the scope of the embodiments is not limited in this respect.

In some embodiments, the mixer circuitry 206*a* of the receive signal path and the mixer circuitry 206*a* of the transmit signal path may include two or more mixers and may be arranged for quadrature downconversion and/or upconversion respectively. In some embodiments, the mixer circuitry 206*a* of the receive signal path and the mixer circuitry 206*a* of the transmit signal path may include two or more mixers and may be arranged for image rejection (e.g., Hartley image rejection). In some embodiments, the mixer circuitry 206*a* of the receive signal path and the mixer circuitry 206*a* may be arranged for direct downconversion and/or direct upconversion, respectively. In some embodiments, the mixer circuitry 206*a* of the receive signal path and the mixer circuitry 206*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206*d* may be a fractional-N synthesizer or a fractional N/N+1 synthesizer, although the scope of the embodiments is not limited in this respect as other types of frequency synthesizers may be suitable. For example, synthesizer circuitry 206*d* may be a delta-sigma synthesizer, a frequency multiplier, or a synthesizer comprising a phase-locked loop with a frequency divider.

The synthesizer circuitry 206*d* may be configured to synthesize an output frequency for use by the mixer circuitry 206*a* of the RF circuitry 206 based on a frequency input and a divider control input. In some embodiments, the synthesizer circuitry 206*d* may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206*d* of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210.

In some embodiments, the UE 200 may include additional elements such as, for example, memory/storage, display, camera, sensor, and/or input/output (I/O) interface as described in more detail below. In some embodiments, the UE 200 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 200 may include one or more user interfaces designed to enable user interaction with the system and/or peripheral component interfaces designed to enable peripheral component interaction with the system. For example, the UE 200 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 210 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210 may be effectively separated to take advantage of spatial diversity and the different channel characteristics that may result.

Although the UE 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 3:
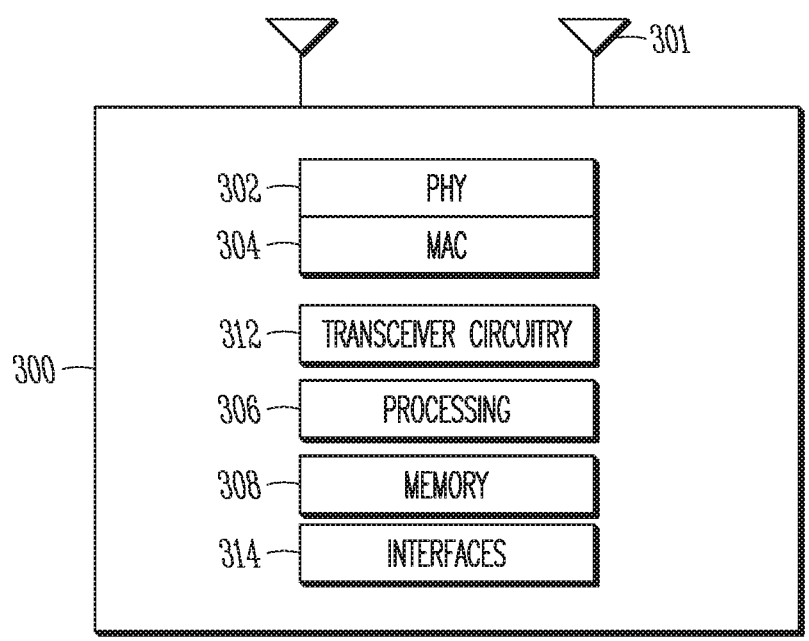
FIG. 3 illustrates a block diagram of a communication device in accordance with some embodiments.

FIG. 3 is a block diagram of a communication device in accordance with some embodiments. The device may be a UE or eNB, for example, such as the UE 102 or eNB 104 shown in FIG. 1 that may be configured to track the UE as described herein. The physical layer circuitry 302 may perform various encoding and decoding functions that may include formation of baseband signals for transmission and decoding of received signals. The communication device 300 may also include medium access control layer (MAC) circuitry 304 for controlling access to the wireless medium. The communication device 300 may also include processing circuitry 306, such as one or more single-core or multi-core processors, and memory 308 arranged to perform the operations described herein. The physical layer circuitry 302, MAC circuitry 304 and processing circuitry 306 may handle various radio control functions that enable communication with one or more radio networks compatible with one or more radio technologies. The radio control functions may include signal modulation, encoding, decoding, radio frequency shifting, etc. For example, similar to the device shown in FIG. 2, in some embodiments, communication may be enabled with one or more of a WMAN, a WLAN, and a WPAN. In some embodiments, the communication device 300 can be configured to operate in accordance with 3GPP standards or other protocols or standards, including WiMax, WiFi, WiGig, GSM, EDGE, GERAN, UMTS, UTRAN, or other 3G, 3G, 4G, 5G, etc. technologies either already developed or to be developed. The communication device 300 may include transceiver circuitry 312 to enable communication with other external devices wirelessly and interfaces 314 to enable wired communication with other external devices. As another example, the transceiver circuitry 312 may perform various transmission and reception functions such as conversion of signals between a baseband range and a Radio Frequency (RF) range.

The antennas 301 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 301 may be effectively separated to take advantage of spatial diversity and the different channel characteristics that may result.

Although the communication device 300 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs, RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

Figure 4:
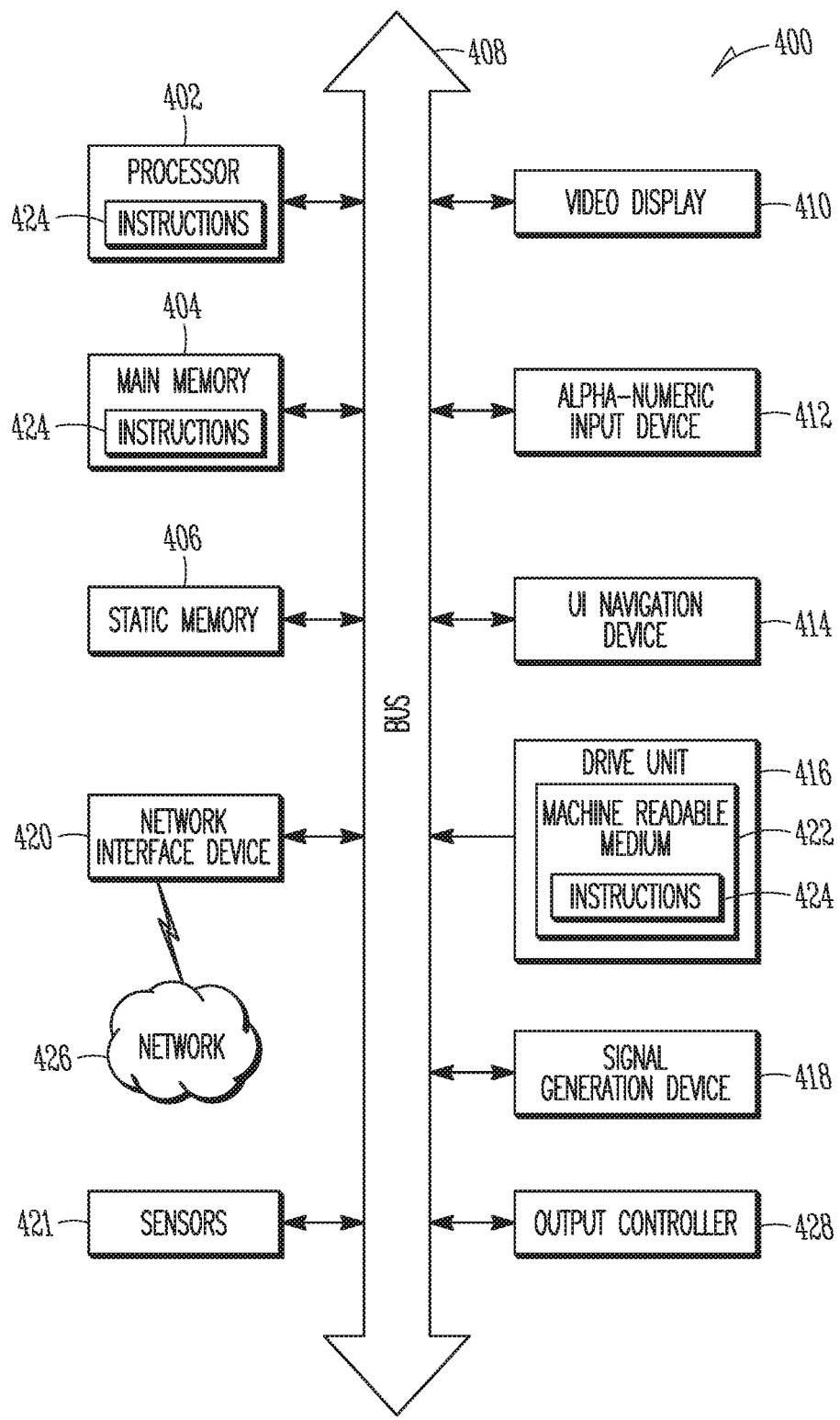
FIG. 4 illustrates another block diagram of a communication device in accordance with some embodiments.

FIG. 4 illustrates another block diagram of a communication device in accordance with some embodiments. In alternative embodiments, the communication device 400 may operate as a standalone device or may be connected (e.g., networked) to other communication devices. In a networked deployment, the communication device 400 may operate in the capacity of a server communication device, a client communication device, or both in server-client network environments. In an example, the communication device 400 may act as a peer communication device in peer-to-peer (P2P) (or other distributed) network environment. The communication device 400 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The communication device 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The communication device 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The communication device 400 may include an output controller 428, such as a serial (e.g., universal serial bus (USB), parallel, or other wired or wireless (e.g., infrared (IR), near field communication (NFC), etc. connection to communicate or control one or more peripheral devices (e.g., a printer, card reader, etc.).

The storage device 416 may include a communication device readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the communication device 400. In an example, one or any combination of the hardware processor 402, the main memory 404, the static memory 406, or the storage device 416 may constitute communication device readable media.

While the communication device readable medium 422 is illustrated as a single medium, the term "communication device readable medium" may include a single medium or multiple media (e.g., a centralized or distributed database, and/or associated caches and servers) configured to store the one or more instructions 424.

The term "communication device readable medium" may include any medium that is capable of storing, encoding, or carrying instructions for execution by the communication device 400 and that cause the communication device 400 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), MIMO, or multiple-input single-output (MISO) techniques. In some examples, the network interface device 420 may wirelessly communicate using Multiple User MIMO techniques. The term "transmission medium" shall be taken to include any intangible medium that is capable of storing, encoding or carrying instructions for execution by the communication device 400, and includes digital or analog communications signals or other intangible medium to facilitate communication of such software.

Figure 17:
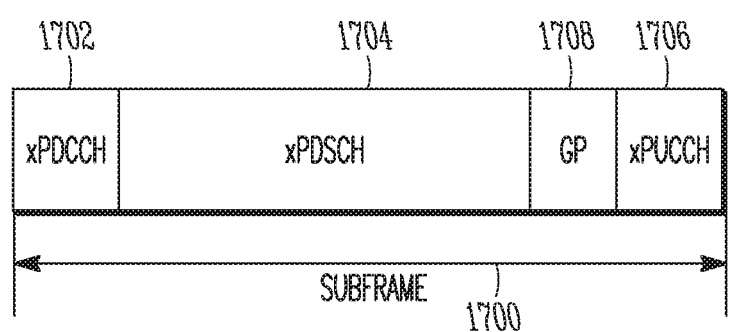
FIG. 17 illustrates a Time Division Duplexed (TDD) self-contained subframe in accordance with some embodiments.

As above, the 5G system may either be FDD or TDD based. FIG. 17 illustrates a TDD self-contained subframe in accordance with some embodiments. To enable low latency transmission for TDD enhanced mobile broadband communication, a self-contained subframe structure 1700 may include a 5G physical downlink control channel (xPDCCH) 1702, a 5G physical downlink shared channel (xPDSCH) 1704, a guard period (GP) 1708 and a 5G physical uplink control channel (xPUCCH) 1706. A self-contained structure, as used herein, is a subframe in which the HARQ ACK/NACK is provided within the same subframe as the received data. The xPDSCH 1704 may be transmitted immediately after the xPDCCH 1702, with the GP 1708 inserted between the xPDSCH 1704 and the xPUCCH 1706 in order to accommodate the DL to UL and UL to DL switching time and round-trip propagation delay. After decoding the xPDSCH 1704, the UE may provide HARQ-ACK or NACK feedback in the xPUCCH 1706, thereby minimizing HARQ-ACK latency for, for example, mission critical MTC and ultra-reliable and low latency applications. This may be enabled in 5G systems as per symbol encoding may be performed in 5G systems, unlike earlier LTE systems, thereby permitting parallel processing of the symbols as they arrive and speeding up the overall processing of the xPDCCH and xPDSCH decoding.

The subframe structure may differ from the TDD 5G subframe structure above for FDD 5G systems in which low latency or self-contained transmissions are desired. Different embodiments may use different placements of the xPDCCH and xPUCCH. Despite this HARQ ACK/NACK feedback for an xPDSCH is to be transmitted within the same subframe or by the next subframe. In particular embodiments, the xPUCCH may be allocated at the start, at the end or at both ends of the subframe.

Figure 5:
FIG. 5 illustrates downlink (DL) and uplink (UL) Frequency Division Duplexing (FDD) subframes in accordance with some embodiments.

FIG. 5 illustrates downlink and uplink Frequency Division Duplexing (FDD) subframes in accordance with some embodiments. Both DL and UL subframes are shown in FIG. 5. In particular, in the downlink subframe 500, the xPDCCH 502 may be transmitted at the start of the DL subframe 500 and the xPDSCH 504 may be transmitted in the DL subframe 500 after the xPDCCH 502. On the other hand, the uplink subframe 510 contains a symmetrical structure. This is to say that in the UL subframe 510, the xPUSCH 514 may be transmitted at the start of the UL subframe 510 and the xPUCCH 512 may be transmitted in the same subframe after the xPUSCH 514.

In some embodiments, the number of symbols allocated for the transmission of one or both of the control signals, the xPDCCH 502 or xPDSCH 504 or xPUCCH 512 or xPUSCH 514, may be predefined in the specification. In some embodiments, the number of symbols allocated for the transmission of one or both of the control and data signals may be configured by higher layer via a 5G master information block (xMIB), 5G system information block (xSIB) or Radio Resource Control (RRC) signaling. In other embodiments, one or more of the control or data region sizes can be dynamically indicated in the dedicated control channel and may change between subframes or sets of subframes. For instance, a 5G physical control frame indicator channel (xPCFICH) can be defined to indicate the number of symbols allocated for the xPDCCH 502 and/or xPDSCH 504 and/or xPUCCH 512 and/or xPUSCH 514. In another embodiment, a dedicated control channel can be used to indicate the number of symbols allocated for the xPDCCH 502 and xPDSCH 504 while higher layer signaling can be used to semi-statically indicate the number of symbols allocated for the xPUCCH 512 and xPUSCH 514.

Figure 6:
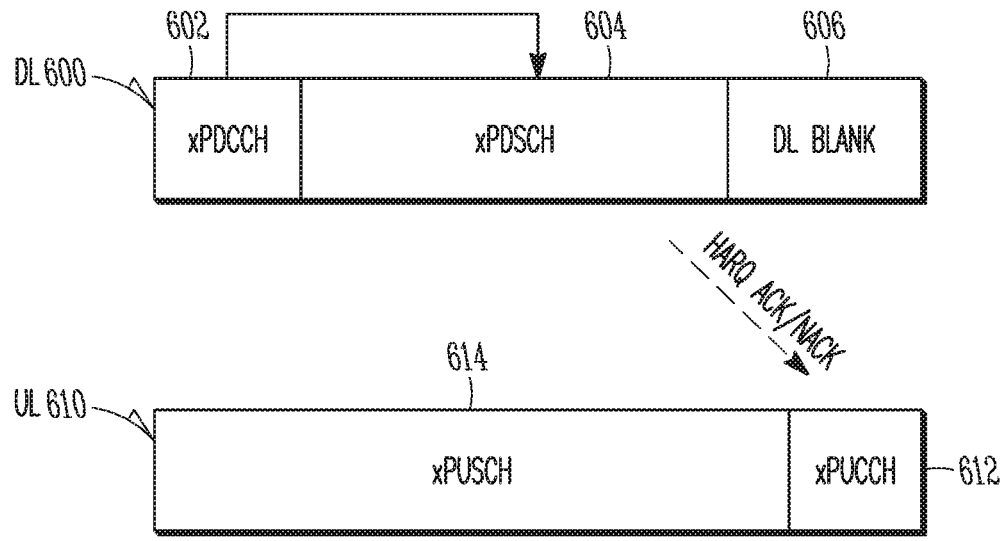
FIG. 6 illustrates self-contained subframes in accordance with some embodiments.

FIG. 6 illustrates self-contained subframes in accordance with some embodiments. In the subframe structure of FIG. 5, self-contained transmission may be achieved in the DL subframe 600 by puncturing a last portion of the DL subframe 600 or by inserting additional signals in the portion of the DL subframe 600. As in FIG. 5, the xPDCCH 602 may be transmitted at the start of the DL subframe 600 and the xPDSCH 604 may be transmitted in the DL subframe 600 after the xPDCCH 602, while in the UL subframe 610, the xPUSCH 614 may be transmitted at the start of the UL subframe 610 and the xPUCCH 612 may be transmitted in the same subframe after the xPUSCH 614. The xPDSCH 604 may be associated with the xPUCCH 612, as indicated by the arrow in FIG. 6. The xPUCCH 612 may be used to provide ACK/NACK signals associated with the xPDSCH 604.

However, in FIG. 6, a DL blank portion 606 of the DL subframe 600 may be added after the xPDSCH 604. The DL blank portion 606 may entirely overlap the xPUCCH 612 in some embodiments, either containing the same number of symbols or a greater number of symbols as the xPUCCH 612. In various embodiments, the number of symbols allocated for the xPDSCH 604 can be semi-statically configured by higher layers via xMIB, xSIB or RRC signaling, or may be indicated dynamically in the DCI for the DL assignment.

In some embodiments, the symbols in DL blank portion 606 can be punctured or reserved as blanked (i.e., unused). In other embodiments, the symbols in the DL blank portion 606 may be used to transmit a broadcast signal such as a physical broadcast channel (xPBCH), 5G primary synchronization signal (xPSS) and 5G secondary synchronization signal (xSSS), channel state information reference signal (CSI-RS), or 5G system information block (xSIB), among others.

Figure 7:
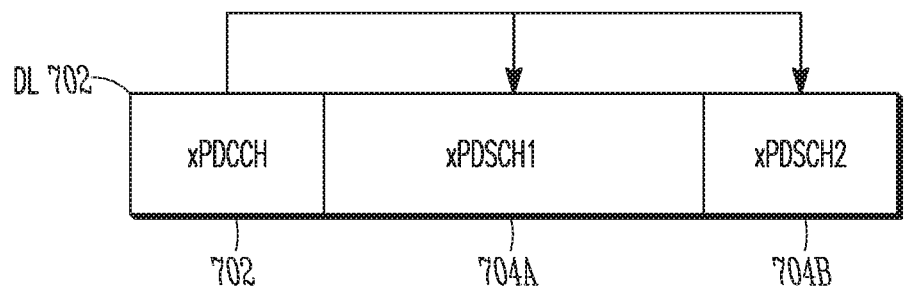
FIG. 7 illustrates a DL subframe in accordance with some embodiments.

In other embodiments, the blank portion in FIG. 6 may be replaced with another data portion. FIG. 7 illustrates a DL subframe in accordance with some embodiments. As shown, the DL subframe 700 comprises an xPDCCH 702 and multiple consecutive XPDSCH transmissions, xPDSCH1 704a and xPDSCH2 704b. Although two xPDSCH transmissions are shown, any number may be used, dependent on the length of the DL frame 700.

The XPDSCH transmissions 704a, 704b may be for different UEs or, in some embodiments, may be used for the same UE. Moreover, the number of symbols used for the xPDSCH transmissions 704a, 704b may be the same or, as shown, may differ between the xPDSCH transmissions 704a, 704b. The information regarding the UEs for which the XPDSCH transmissions 704a, 704b are intended and scheduling may be provided by the xPDCCH 702. The number of symbols used for each xPDSCH transmission 704a, 704b may be indicated, as above, xMIB, xSIB or RRC signaling, or in the DCI for the DL assignment. Self-contained transmission may be achieved for the UE associated with xPDSCH1 704a, but not for the UE associated with xPDSCH2 704b. The HARQ ACK/NACK feedback for xPDSCH2 704b may be transmitted in the xPUCCH of the next subframe.

Figure 8:
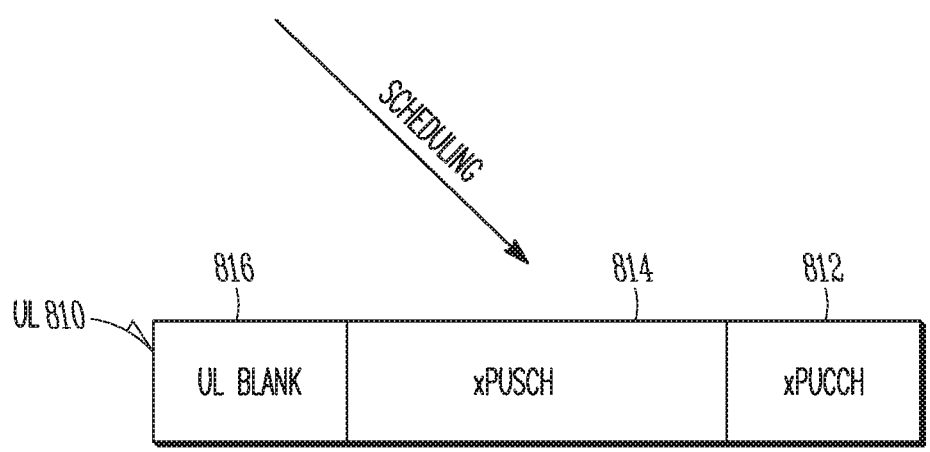
FIG. 8 illustrates DL and UL FDD subframes in accordance with some embodiments.

FIG. 8 illustrates DL and UL FDD subframes in accordance with some embodiments. The DL subframe 800 comprises an xPDCCH 802 and an xPDSCH 804. The UL subframe 810 comprises an xPUCCH 812 and an xPUSCH 814. The UL subframe 810, like the DL subframe shown in FIG. 6, may have a UL blank portion 816 before the xPUSCH 814. The UL blank portion 816 may entirely overlap the xPDCCH 802 in some embodiments, either containing the same number of symbols or a greater number of symbols as the xPDCCH 802. The xPDCCH 802 may be used to indicate the xPUSCH 814 opportunity to the UE, and thus be associated with the xPUSCH 814, as indicated by the arrow in FIG. 8.

In some embodiments, the symbols in UL blank portion 816 can be punctured or reserved as blanked. In other embodiments, the symbols in the UL blank portion 816 may be used to transmit additional signaling, such as a sounding reference signal (SRS), an xPRACH, or xPUSCH for another UE to improve the spectrum efficiency.

Self-contained UL transmission may not be able to be achieved as the eNB may use the xPDCCH 802 or 5G physical HARQ indicator channel (xPHICH) to carry UL HARQ ACK/NACK feedback in the next subframe. Similar to the DL transmission, the starting and last symbol for the xPUSCH transmission 812 can be semi-statically set by higher layers via xMIB, xSIB or RRC signaling or may be dynamically indicated in the DCI for UL grant.

Figure 9:
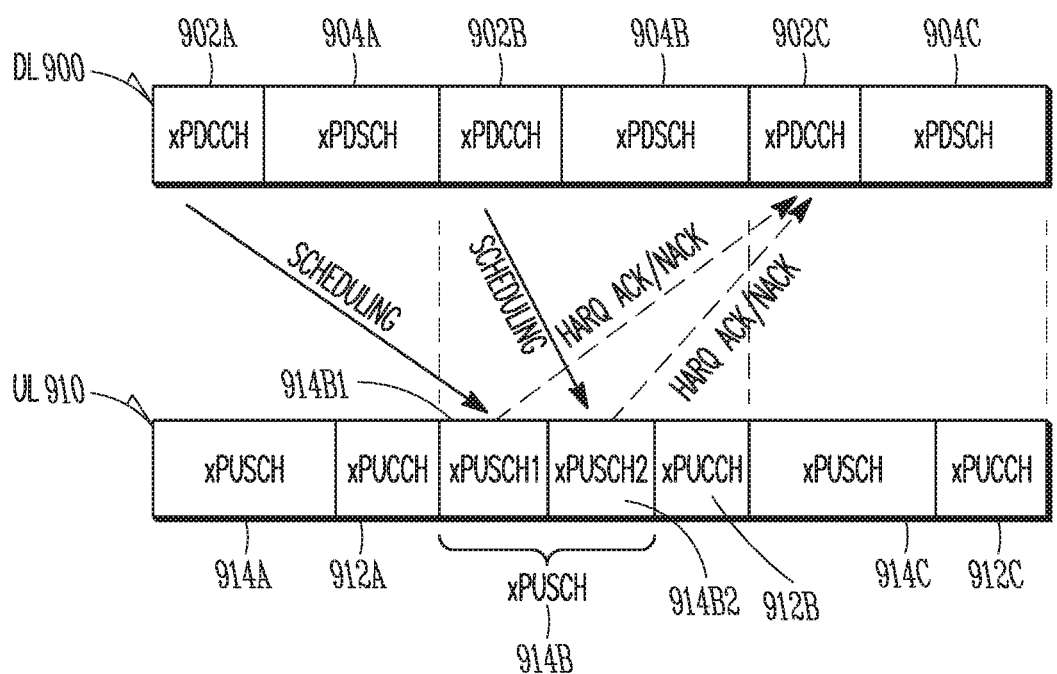
FIG. 9 illustrates DL and UL FDD subframes in accordance with some embodiments.

In other embodiments, the UL portion that is not used for an xPUSCH of the UE may be disposed in an alternative location and used to provide other signaling. FIG. 9 illustrates DL and UL FDD subframes in accordance with some embodiments. Similar to the above embodiments, in FIG. 9 each of a plurality of DL subframes 900 comprises an xPDCCH 902a, 902b, 902c and an xPDSCH 904a, 904b, 904c. Each of a plurality of UL subframes 910 comprises an xPUSCH 914a, 914b, 914c and an xPUCCH 912a, 912b, 912c following the xPUSCH 914a, 914b, 914c. In addition, in at least one of the subframes, the xPUSCH 914b may comprise multiple xPUSCHs 914b1, xPUSCH 914b2 for different UEs. Although only two xPUSCHs are shown, a greater number may be used so long as the xPUSCHs occupy in total the same number of symbols as the total number of symbols used by the other xPUSCHs 914a, 914c.

Cross-subframe scheduling may be applied for some, but not all, of the xPUSCHs as shown in FIG. 9. As shown, cross-subframe scheduling may be used to schedule the first xPUSCH 914b1 (for the first UE). The xPDCCH 902a of an immediately previous subframe may be used to schedule the first xPUSCH 914b1. In FIG. 9, the second xPUSCH 914b2 (for the second UE—the later xPUSCH) may use same subframe scheduling. For low latency transmission, the UL HARQ ACK/NACK for both the first and second xPUSCH 914b1, 914b2 may be transmitted in the UL subframe immediately succeeding the UL subframe in which the xPUSCH is transmitted, as shown in FIG. 9. Thus, the UL HARQ ACK/NACK timing may differ between xPUSCH1 and xPUSCH2 (e.g., for different UEs). In other embodiments, the HARQ ACK/NACK associated with different xPUSCHs from different subframes may be coordinated to be received in an xPDCCH, which may be in a different subframe from any of the xPUSCH. In some circumstances, the HARQ ACK/NACK associated with one xPUSCH may result in a self-contained structure while associated with another xPUSCH may result in a structure in which the HARQ ACK/NACK is provided in the next subframe.

More generally, the xPDCCH of a previous subframe may be used to schedule one of the xPUSCHs in a particular subframe. Moreover, the xPDCCHs of multiple previous subframes may be used to schedule different xPUSCHs in the same subframe. In some embodiments, the xPUSCHs may correspond in time with the time of assignment by the xPDCCHs so that the first xPUSCH is assigned by the first xPDCCH, the second xPUSCH is assigned by the second xPDCCH, etc. . . . . In other embodiments, the xPDCCH may indicate which of the xPUSCHs is being assigned so that the order of the xPUSCHs may be different from the order of assignment by the xPDCCHs. In some embodiments, however, the last xPUSCH in the subframe may be reserved for same subframe scheduling. In some embodiments, each xPUSCH may be associated with a different UE. In other embodiments, at least some of the xPUSCHs may be associated with the same UE, with the xPUSCHs associated with the same UE being consecutive or non-consecutive.

Figure 10:
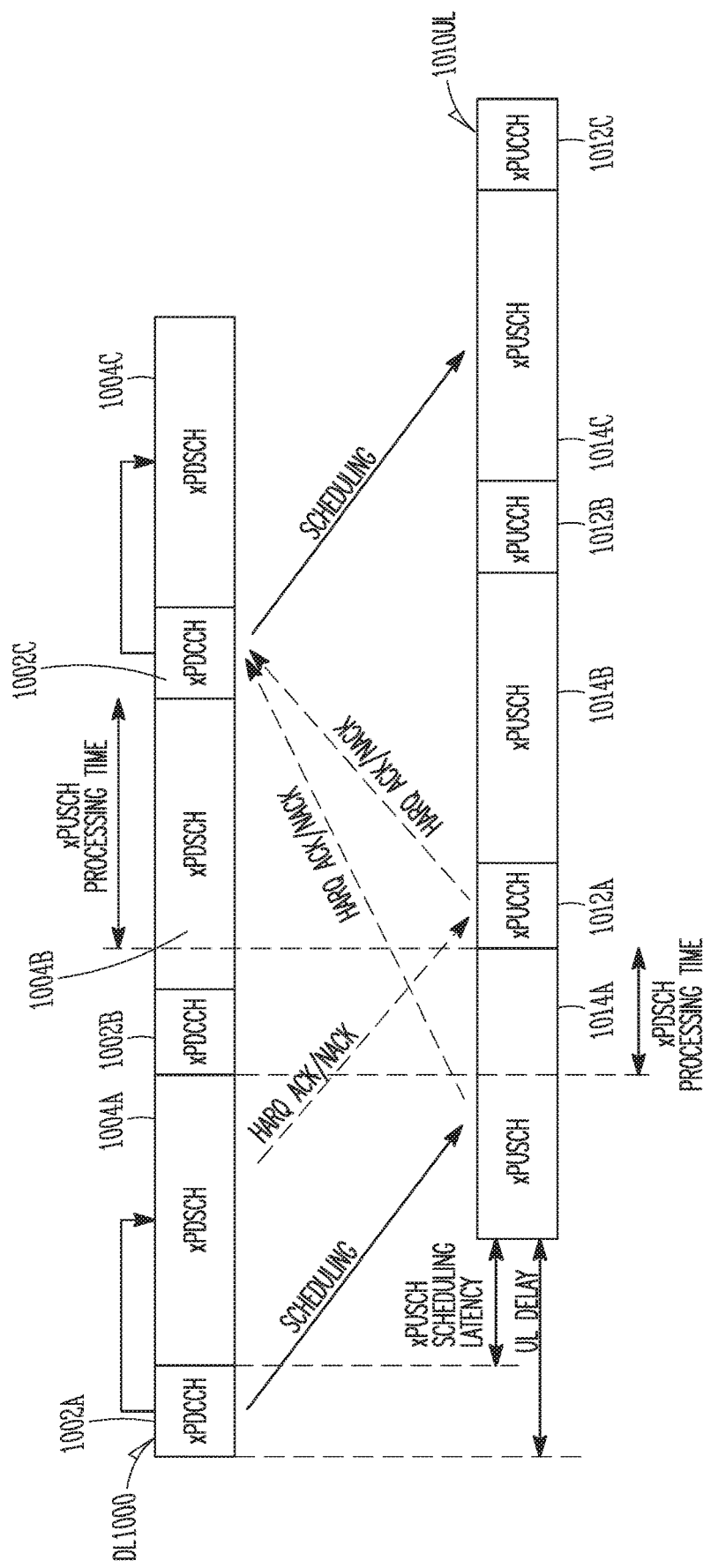
FIG. 10 illustrates DL and UL FDD subframes in accordance with some embodiments.

Although the various embodiments shown in the previous figures have DL and UL subframes that occur at the same time, in other embodiments, this may not be the case. FIG. 10 illustrates DL and UL FDD subframes in accordance with some embodiments. In FIG. 10, each of a plurality of DL subframes 1000 comprises an xPDCCH 1002a, 1002b, 1002c and an xPDSCH 1004a, 1004b, 1004c following the associated xPDCCH 1002a, 1002b, 1002c. Each of a plurality of UL subframes 1010 comprises an xPUSCH 1014a, 1014b, 1014c and an xPUCCH 1012a, 1012b, 1012c following the xPUSCH 1014a, 1014b, 1014c. As shown, the timing of each UL subframe 1010 may be delayed relative to the DL subframe 1000 by a UL delay. The time difference between the end of the xPDCCH 1002a, 1002b, 1002c and the beginning of the xPUSCH 1014a, 1014b, 1014c is the xPUSCH scheduling delay. The time difference between the beginning of the xPDCCH 1002a, 1002b, 1002c and the beginning of the xPUCCH 1012a, 1012b, 1012c is the xPDSCH processing time, while the tame difference between the beginning of the xPUCCH 1012a, 1012b, 1012c and the beginning of the xPDCCH 1002a, 1002b, 1002c is the xPUSCH processing time.

The amount of UL delay can be a fixed parameter (fixed by specification). In other embodiments, the amount of UL delay may be configurable on a cell-by-cell basis. In some embodiments, the amount of UL delay may be provided to the UEs via an xMIB or xSIB transmission. The amount of the UL delay provides a tradeoff between the available xPUSCH processing time and the available xPDSCH processing time and xPUSCH scheduling delay. In some embodiments, the delay may be chosen to account for propagation delay and processing times of the control and data channels, and permit both UL and DL low latency operation without providing blank xPDSCH or xPUSCH symbols. The time delay may be used to avoid providing a blank portion (see, e.g., FIG. 12) to permit processing of the xPDSCH to occur to enable a HARQ ACK/NACK response to be transmitted.

Figure 11:
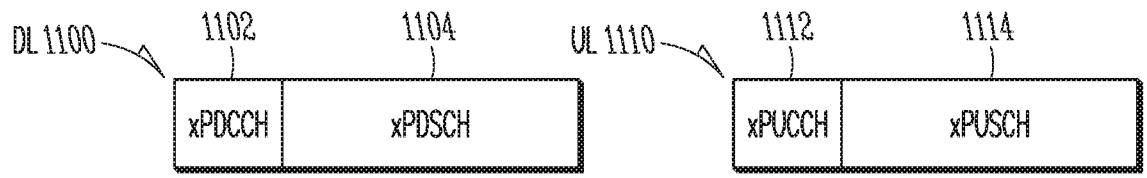
FIG. 11 illustrates DL and UL FDD subframes in accordance with some embodiments.

In each of the embodiments of FIGS. 5-10, the xPUCCH is disposed at the end of the UL subframe, with the xPUSCH accordingly disposed at the front of the UL subframe. FIG. 11 illustrates DL and UL FDD subframes in accordance with some embodiments. As shown, in the downlink subframe 1100, the xPDCCH 1102 may be transmitted at the start of the DL subframe 1100 and the xPDSCH 1104 may be transmitted in the DL subframe 1100 after the xPDCCH 1102. Similarly, in the UL subframe 1110, the xPUCCH 1112 may be transmitted at the start of the UL subframe 1110 and the xPUSCH 1114 may be transmitted in the same subframe after the xPUCCH 1112. In this embodiment, fully self-contained transmission may not be achieved for both the DL and UL subframes 1200, 1210 due to the fact that the HARQ ACK/NACK may be transmitted in the subframe immediately following data transmission. However, a fully symmetric DL/UL design can be achieved for this subframe structure as depicted.

Figure 12:
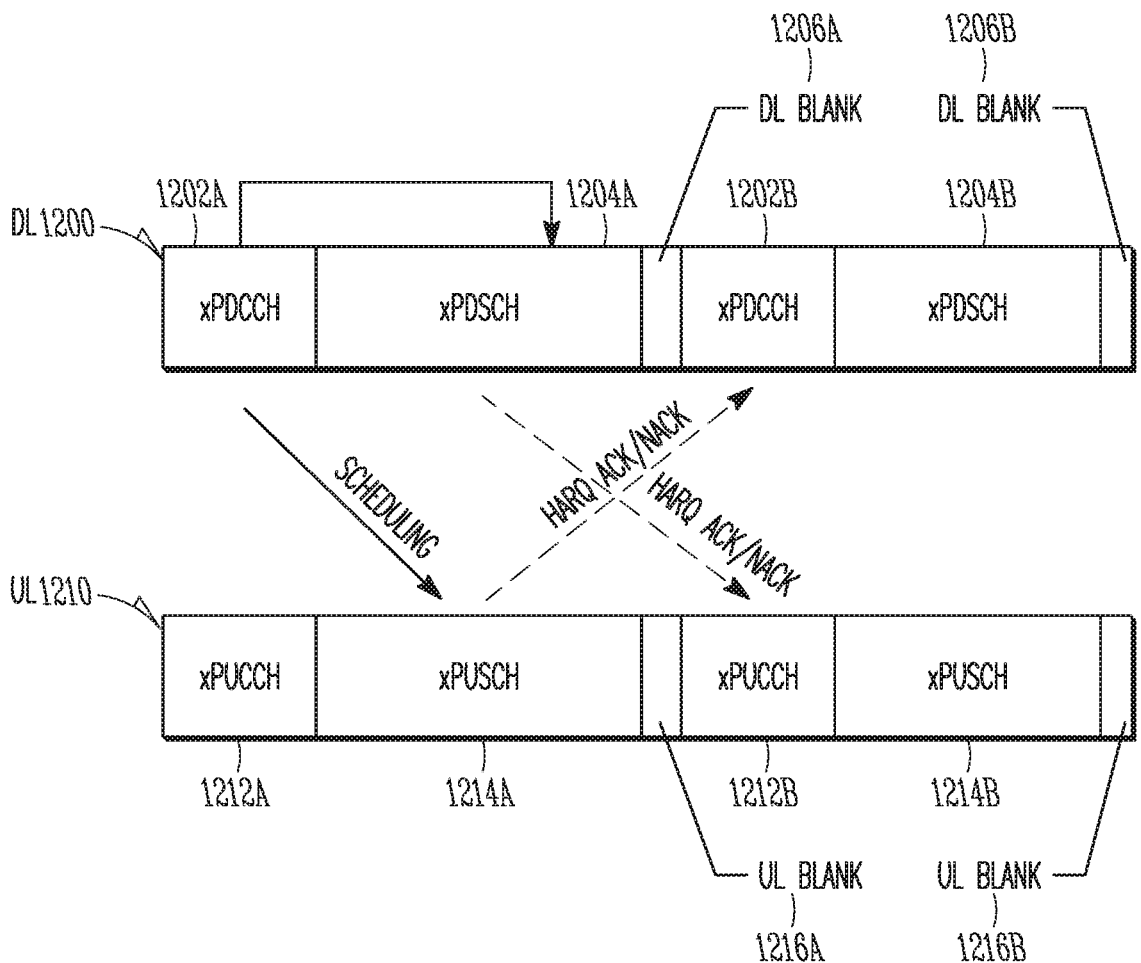
FIG. 12 illustrates DL and UL FDD subframes in accordance with some embodiments.

FIG. 12 illustrates DL and UL FDD subframes in accordance with some embodiments. Similar to FIG. 11, in each DL subframe 1200, the xPDCCH 1202a, 1202b may be transmitted at the start of the DL subframe 1200 and the xPDSCH 1204a, 1204b may be transmitted in the DL subframe 1200 after the xPUCCH 1202a, 1202b. Similarly, in each UL subframe 1210, the xPUCCH 1212a, 1212b may be transmitted at the start of the UL subframe 1210 and the xPUSCH 1214a, 1214b may be transmitted in the same subframe after the xPUCCH 1212a, 1212b.

In addition, a DL blank portion 1206a, 1206b may be disposed between the xPDCCH 1202a, 1202b and the xPDSCH 1204a, 1204b of a particular subframe, and an UL, blank portion 1216a, 1216b may be disposed between the xPUCCH 1212a, 1212b and the xPUSCH 1214a, 1214b of a particular subframe. This is similar to the embodiment shown in FIG. 6 in which a last portion of each of the DL and UL subframe 1200, 1210 may be punctured or may be used for the transmission of other signals. The DL blank portion 1206a, 1206b and UL blank portion 1216a, 1216b may be of sufficient length (number of symbols) to allow the UE to receive and decode the data channel and prepare the HARQ ACK/NACK transmission. However, given that the HARQ ACK/NACK is transmitted in the subframe immediately succeeding the data transmission, less overhead (fewer symbols) or better spectrum efficiency may be achieved compared to that shown in FIG. 6.

Figure 13:
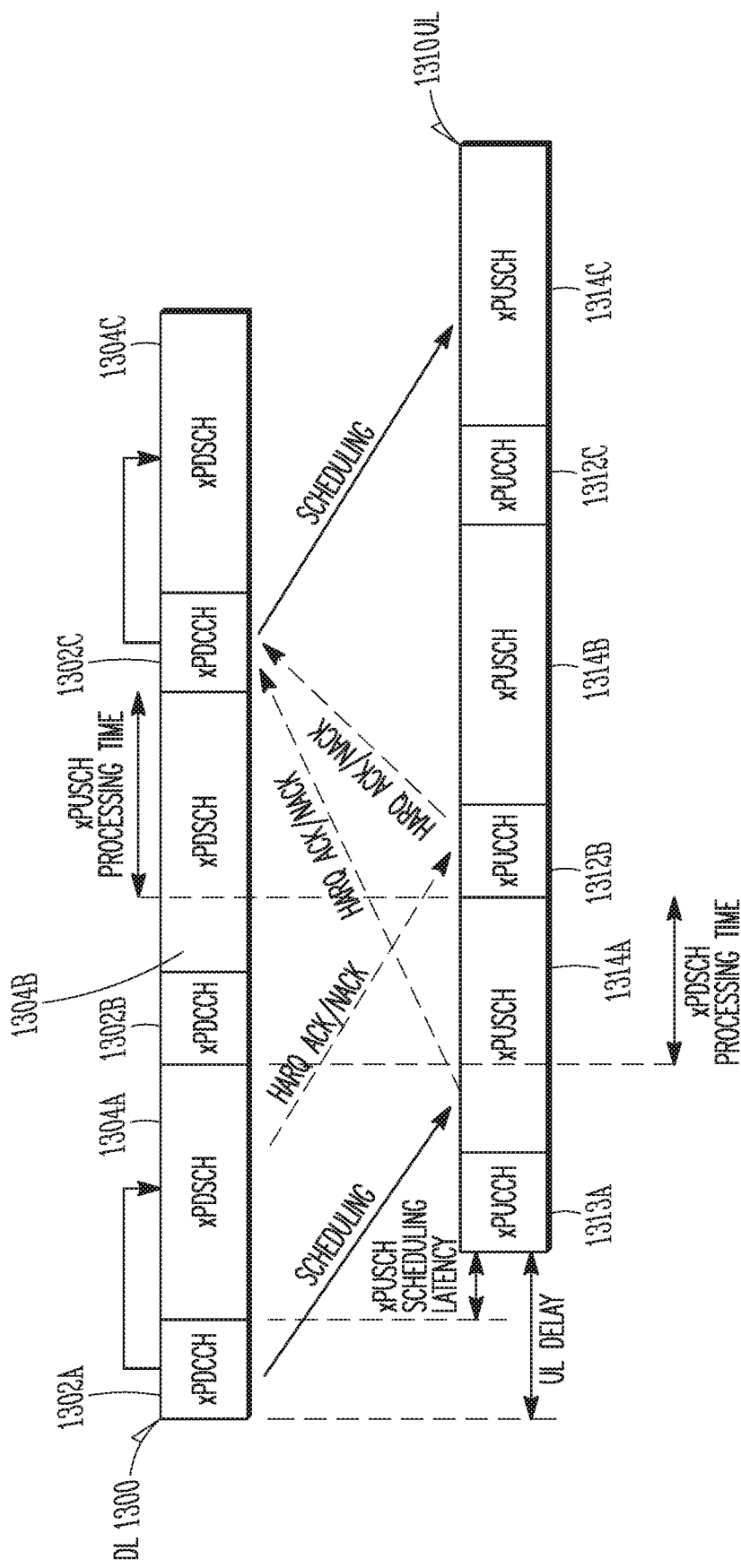
FIG. 13 illustrates DL and UL FDD subframes in accordance with some embodiments.

FIG. 13 illustrates DL and UL FDD subframes in accordance with some embodiments. The embodiment of FIG. 13 is similar to FIG. 10; each of a plurality of DL subframes 1300 comprises an xPDCCH 1302a, 1302b, 1302c and an xPDSCH 1304a, 1304b, 1304c following the associated xPDCCH 1302a, 1302b, 1302c. Each of a plurality of UL subframes 1313 comprises an xPUSCH 1314a, 1314b, 1314c and an xPUCCH 1312a, 1312b, 1312c following the xPUSCH 1314a, 1314b, 1314c. As shown, the timing of each UL subframe 1313 may be delayed relative to the DL subframe 1300 by a UL delay. The time difference between the end of the xPDCCH 1302a, 1302b, 1302c and the beginning of the xPUSCH 1314a, 1314b, 1314c is the xPUSCH scheduling delay. The time difference between the beginning of the xPDCCH 1302a, 1302b, 1302c and the beginning of the xPUCCH 1312a, 1312b, 1312c is the xPDSCH processing time, while the time difference between the beginning of the xPUCCH 1312a, 1312b, 1312c and the beginning of the xPDCCH 1302a, 1302b, 1302c is the xPUSCH processing time.

The amount of UL delay can be a fixed parameter (fixed by specification). In other embodiments, the amount of UL delay may be configurable on a cell-by-cell basis. In some embodiments, the amount of UL delay may be provided to the UEs via an OMB or xSIB transmission. The amount of the UL delay provides a tradeoff between the available xPUSCH processing time and the available xPDSCH processing time and xPUSCH scheduling delay. In some embodiments, the delay may be chosen to account for propagation delay and processing times of the control and data channels, and permit both UL and DL low latency operation without providing blank xPDSCH or xPUSCH symbols.

Figure 14:
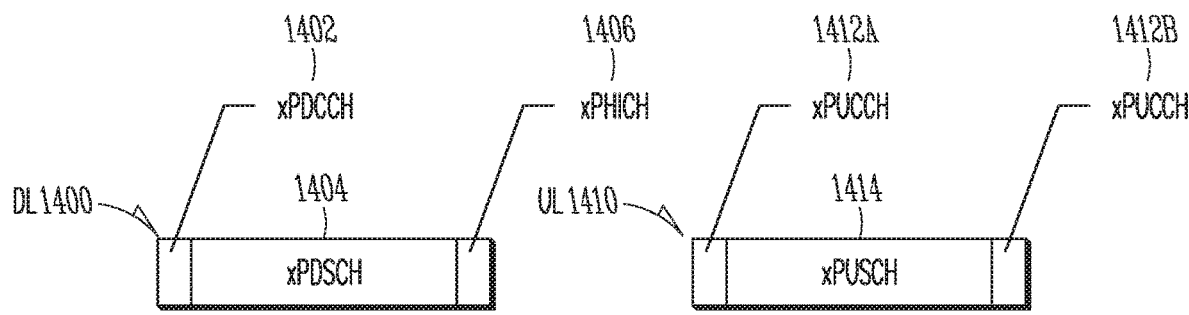
FIG. 14 illustrates DL and UL FDD subframes in accordance with some embodiments.

FIG. 14 illustrates DL and UL FDD subframes in accordance with some embodiments. The DL subframe 1400 comprises an xPDCCH 1402 transmitted at the start of the DL subframe 1400, an xPDSCH 1404 transmitted after the xPDCCH 1402 and an xPHICH or xPDCCH 1406 transmitted at the end of the DL subframe 1400 after the xPDSCH 1404. The UL subframe 1410 comprises a first xPUCCH 1412a transmitted at the start of the UL subframe 1410, an xPUSCH 1414 transmitted after the first xPUCCH 1412a and a second xPUCCH 1412b transmitted after the xPUSCH 1414 at the end of the UL subframe 1410. Thus, DL and UL control channels are allocated at each end of the DL and UL subframe 1400, 1410. Although an xPHICH 1406 is shown as being allocated at the end of the DL subframe 1400, in some embodiments another xPDCCH may be allocated in the last portion of the DL subframe 1400.

Embodiments in which control channels are present at both ends of the subframe may be able to achieve full self-contained transmission within one subframe for both DL and UL subframes. Such a subframe structure may be desirable for mission critical MTC applications, for which ultra-reliable and low latency communications may be paramount.

Figure 15:
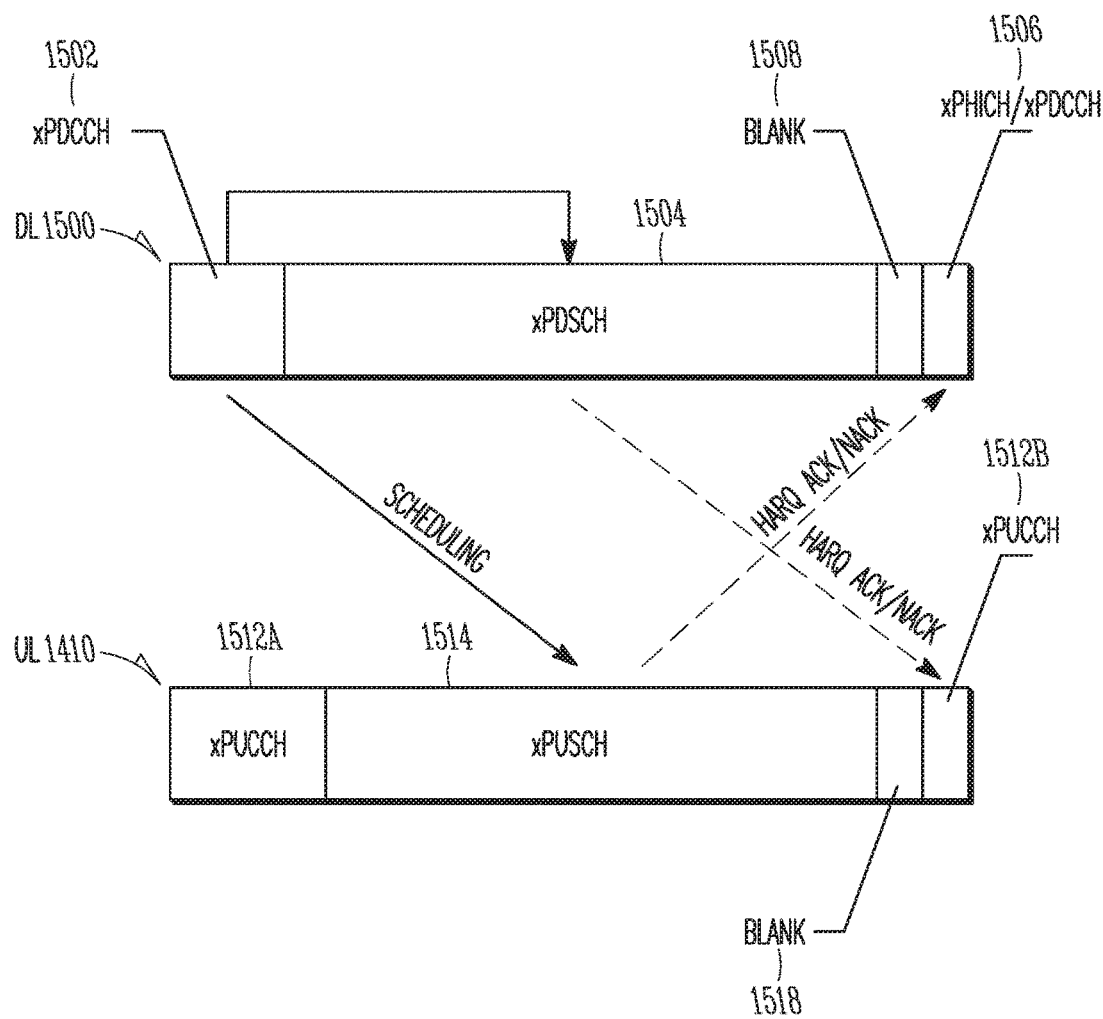
FIG. 15 illustrates DL and UL FDD subframes in accordance with some embodiments.

FIG. 15 illustrates DL and UL FDD subframes in accordance with some embodiments. The DL subframe 1500 comprises an xPDCCH 1502 transmitted at the start of the DL subframe 1500, an xPDSCH 1504 transmitted after the xPDCCH 1502, a blank portion 1508 transmitted after the xPDSCH 1504 and an xPHICH or another xPDCCH 1506 transmitted at a DL blank portion of the DL subframe 1500 after the blank portion 1508. The UL subframe 1510 comprises a first xPUCCH 1512a transmitted at the start of the UL subframe 1510, an xPUSCH 1514 transmitted after the first xPUCCH 1512a, a blank portion 1518 transmitted after the xPUSCH 1514 and a second xPDCCH 1512b transmitted at the end of the UL subframe 1510 after the blank portion 1518. As in FIG. 14, DL and UL control channels are allocated at each end of the DL and UL subframe 1500, 1510. The blank portions 1508, 1518 of the DL and UL subframe may be punctured or other, non-data signals may be inserted to enable fully self-contained transmission within one subframe. The non-data signals may include one or more of reference signals, such as an SRS or xPRACH, reports, such as a CSI report, and broadcast signals.

As shown, the xPDSCH 1504 may be transmitted in the DL subframe 1500 after the associated xPDCCH 1502. The UE may provide the DL HARQ ACK/NACK feedback via the second xPUCCH 1512b in the same subframe. In some embodiments, the second xPDCCH 1512b in the last portion of subframe may be used only to carry DL HARQ ACK/NACK. Similarly, the xPUSCH 1514 may be transmitted after the associated first xPDCCH 1512a in the UL subframe 1510. The eNB may provide the UL HARQ ACK/NACK feedback via the xPHICH 1506 (or a second xPDCCH that replaces the PHICH 1506 in a different embodiment) in the same subframe. In some embodiments, the first partition of subframe can be allocated for an xPUCCH 1512a that may be used to carry a scheduling request (SR) and/or CSI report. In other embodiments, the xPUCCH 1512a may in addition or instead report a periodic Buffer Status Report (BSR) via the first xPUCCH 1512a. The signal format of the first xPUCCH 1512a may thus be different from that of the second xPUCCH 1512b. The SRS may be inserted between the first xPUCCH 1512a and the xPUSCH 1514 or between the xPUSCH 1514 and the second xPUCCH 1512b. Note that in FIG. 15 both the UL and DL subframes 1500, 1510 are self-contained as both the UL and DL HARQ ACK/NACK are received in the same subframe as the associated data channel (xPUSCH and xPDSCH).

Figure 16:
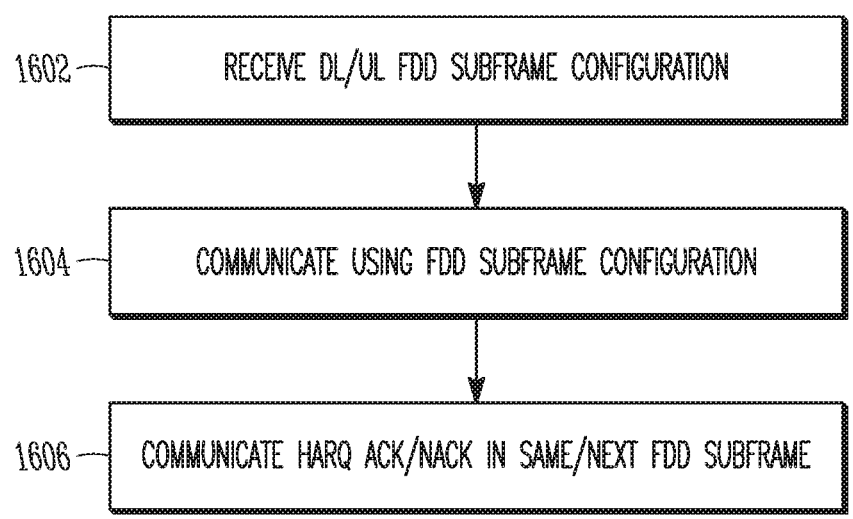
FIG. 16 illustrates a method of FDD communicating in accordance with some embodiments.

FIG. 16 illustrates a method of FDD communicating in accordance with some embodiments. The method may be performed by any of the UEs shown and described in FIGS. 1-4 and use any of the DL or UL transmissions shown in FIGS. 5-15. Embodiments of the method may thus include additional or fewer operations or processes in comparison to what is illustrated in FIG. 16. In addition, embodiments of the method are not necessarily limited to the chronological order that is shown in FIG. 16. In addition, while the method and other methods described herein may refer to UEs operating in accordance with 3GPP or other standards, embodiments of those methods are not limited to just those UEs and may also be practiced by other communication devices. For example, while UE-eNB communications are shown in the various figures, in some embodiments one or more of the portions of the FDD subframes may be allocated for device-to-device (D2D) communications.

At operation 1602, the UE may receive DL and UL FDD subframe configuration. The information may indicate which of the different types of subframe configurations shown in FIGS. 5-15 are to be used for communication with the eNB. For example, the configuration information may indicate the number of symbols that are used in each portion of the UL and DL FDD subframe, what FDD subframe structure is used, including which portions are present within a particular FDD subframe as well as their placement, the delay between the DL and UL FDD subframe and HARQ ACK/NACK timing specifics, among others. The FDD subframe configuration may be provided in a MIB, SIB, RRC signaling or other higher layer signaling.

At operation 904, the UE may communicate with the eNB using the FDD subframe configuration information. This includes contemporaneously transmitting and receiving FDD control or data signals. For example, the UE may receive and decode DL signals. The DL subframe comprises multiple xPDCCH transmissions, of which one or more may be intended for the UE (e.g., the configuration information may indicate that only one xPDCCH may be used in a particular subframe for a particular UE and thus the UE may avoid decoding certain xPDCCHs, or that any of the xPDCCHs may be used for any UE, and/or that a portion of the DL subframe may be blank to permit the UE to decode the scheduling information provided in the xPDCCH or reserved for particular signaling, such as a broadcast signal. For example, the DL FDD subframe may contain multiple xPDCCHs and/or xPDSCHs for the UE or different UEs. The UE may receive an xPDCCH transmission and, from the configuration information, decode the xPDCCH and determine whether the xPDCCH is addressed to the UE.

In response to determining that the xPDCCH is associated with the UE, the UE may generate and transmit an xPUSCH indicated by the xPDCCH. The UL FDD subframe, as indicated in the FDD subframe configuration of 902, may include one or more xPUCCHs and/or xPDSCHs, as well as blank portion and/or reserved for particular non-data signaling, such as report transmission.

Once the UL/DL data and control information has been received at operation 904, the UE and/or eNB may communicate HARQ ACK/NACK at operation 906. In particular, due to the 5G FDD subframe configuration, the HARQ ACK/NACK may be provided either in the same FDD subframe or in an immediately succeeding FDD subframe. For example, unlike LTE based systems, in which the HARQ ACK/NACK response takes multiple subframes to be received, the DL HARQ ACK/NACK may be disposed in the same FDD subframe in situations in which the xPDSCH is disposed at the beginning of the DL FDD subframe and the xPUCCH (or one of the xPUCCHs) is disposed at the end of the UL FDD subframe. Otherwise, the DL HARQ ACK/NACK may be disposed in the next subframe. Similarly, the UL HARQ ACK/NACK may be disposed in the same FDD subframe in situations in which the xPUSCH is disposed at the beginning of the UL FDD subframe and the xPDCCH (or one of the xPDCCHs) is disposed at the end of the DL FDD subframe. In embodiments in which multiple xPUSCHs or xPDSCHs are disposed in a single FDD subframe, the HARQ ACK/NACK associated with the xPUSCHs or xPDSCHs may be combined and communicated in the next xPDCCH or xPUCCH, respectively. This may reduce the latency of the HARQ ACK/NACK signals, allowing the system to be used for low-latency ultra-reliable or mission critical applications. The eNB may, in fact, select the FDD subframe configuration based on the UE applications provided by the UE in separate signaling. The eNB may, for example, modify the FDD configuration to permit same FDD subframe HARQ ACK/NACK transmissions when ultra-reliable or mission critical applications are being used by the UE.

EXAMPLES

In Example 1, the subject matter of Example undefined optionally includes An apparatus of user equipment (UE), the apparatus comprising: a memory; and processing circuitry in communication with the memory and configurable to: decode a 5th generation (5G) physical downlink control channel (xPDCCH) and associated 5G physical downlink shared channel (xPDSCH) received within a current frequency division duplex (FDD) subframe from an evolved NodeB (eNB) and generate a Hybrid Automatic Repeat Request (HARQ) Acknowledgement (ACK)/Negative Acknowledgement (NACK) for the xPDSCH for transmission via a 5G physical uplink control channel (xPUCCH) in the current FDD subframe or in a next FDD subframe immediately following the current FDD subframe; and decode an xPDCCH received within the current FDD subframe, generate a 5G physical uplink shared channel (xPUSCH) within the current FDD subframe in response to the xPDCCH and, in response to transmission of the xPUSCH, decode a HARQ ACK/NACK carried by another xPDCCH or a 5G physical HARQ indicator channel (xPHICH) in the current FDD subframe or in the next FDD subframe.

In Example 2, the subject matter of Example 1 optionally includes, wherein: the xPDSCH is disposed in the current FDD subframe after the xPDCCH and the xPUCCH is disposed in the current FDD subframe after the xPUSCH.

In Example 3, the subject matter of Example 2 optionally includes, wherein: a portion of the current FDD subframe after the xPDSCH comprises symbols that overlap in time with the xPUCCH such that the xPUCCH fully overlaps the portion, and for self-contained DL transmission the portion is one of: punctured or blanked, or comprises one of: a physical broadcast channel (xPBCH), a 5G primary synchronization signal (xPSS) and 5G secondary synchronization signal (xSSS), a channel state information reference signal (CSI-RS), or a 5G system information block (xSIB).

In Example 4, the subject matter of any one or more of Examples 2-3 optionally include, wherein: a portion of the current FDD subframe after the xPDSCH comprises the other xPDSCH, which is associated with one of the UE or a different UE.

In Example 5, the subject matter of any one or more of Examples 2-4 optionally include, wherein: A portion of the current FDD subframe before the xPUSCH comprises symbols that overlap in time with the xPDCCH such that the xPDCCH fully overlaps the portion, and for self-contained UL transmission the portion is punctured, blanked or comprises a reference or control signal from the UE.

In Example 6, the subject matter of any one or more of Examples 2-5 optionally include, wherein: a portion of the current FDD subframe before the xPUSCH comprises another xPUSCH associated with one of the UE or a different UE.

In Example 7, the subject matter of any one or more of Examples 1-6 optionally include, wherein: for self-contained downlink (DL) and uplink (UL) transmission, the xPUCCH and xPUSCH is delayed relative to the xPDCCH and xPDSCH, and an amount of delay is a parameter that is fixed by a Third Generation Partnership Project (3GPP) specification or configurable on a cell-by-cell basis via a 5G master information block (xMIB), a 5G system information block (xSIB) or a Radio Resource Control (RRC) signaling.

In Example 8, the subject matter of any one or more of Examples 1-7 optionally include, wherein: the xPDCCH is disposed in a portion of the current FDD subframe, the xPDSCH is disposed after the xPDCCH, and the other xPDCCH or the xPHICH is allocated in a portion of the current FDD subframe, and a first xPUCCH is disposed in the portion, a second xPUCCH is disposed in the portion of the current FDD subframe and the xPUSCH is disposed between the xPUCCHs.

In Example 9, the subject matter of Example 8 optionally includes, wherein: the first xPUCCH is allocated to carry at least one of a scheduling request (SR), a channel state information (CSI) report or a periodic Buffer Status Report (BSR) report.

In Example 10, the subject matter of any one or more of Examples 8-9 optionally include, wherein: a signal format of the first xPUCCH is different from a signal format of the second xPUCCH, and the second xPUCCH is reserved for a HARQ ACK/NACK transmission.

In Example 11, the subject matter of any one or more of Examples 8-10 optionally include, wherein: a sounding reference signal (SRS) is disposed between at least one of the first xPUCCH and the xPUSCH, and the xPUSCH and the second xPUCCH.

In Example 12, the subject matter of any one or more of Examples 8-11 optionally include, wherein: a portion of the current FDD subframe at least one of between the xPDSCH and the xPDCCH or xPHICH and between the xPUSCH and the xPUCCH is punctured or contains at least one reference or control signal.

In Example 13, the subject matter of any one or more of Examples 1-12 optionally include, wherein: the xPDCCH is disposed in a portion of the current FDD subframe and the xPDSCH is disposed after the xPDCCH, and the xPUCCH is disposed in the portion of the current FDD subframe and the xPUSCH is disposed after the xPUCCH.

In Example 14, the subject matter of any one or more of Examples 1-13 optionally include, wherein: the processing circuitry comprises baseband circuitry configured to determine at least one of a number of symbols allocated for the xPDCCH or xPUCCH or a starting and last symbol for the xPDSCH or xPUSCH, and at least one of: the number of symbols is one of: predefined in a Third Generation Partnership Project (3PP) specification, configured by higher layer signaling via a 5G master information block (xMIB), a 5G system information block (xSIB) or a Radio Resource Control (RRC) signaling, or dynamically indicated in a 5G physical control frame indicator channel (xPCFICH), and the starting and last symbol is one of: semi-statically configured by higher layers via the xMIB, the xSIB or the RRC signaling, or dynamically indicated in downlink control information (DCI) for an downlink or uplink grant.

In Example 15, the subject matter of any one or more of Examples 1-14 optionally include, further comprising: an antenna configured to provide communications between the UE and the eNB.

Example 16, includes an apparatus of an evolved NodeB (eNB) comprising: a memory; and processing circuitry in communication with the memory and configurable to: within a current frequency division duplex (FDD) subframe: generate, for transmission to a user equipment (UE), a downlink (DL) FDD subframe comprising 5th generation (5G) (xPDCCH) and associated 5G physical downlink shared channel (xPDSCH), and generate an xPDCCH and decode a 5G physical uplink shared channel (xPUSCH) of an uplink (UL) FDD subframe in response to transmission of the xPDCCH, the UL comprising a 5G physical uplink control channel (xPUCCH) and the xPUSCH, and within at most one FDD subframe from the current FDD subframe: decode a Hybrid Automatic Repeat Request (HARQ) Acknowledgement (ACK)/Negative Acknowledgement (NACK) for the xPDSCH from the xPUCCH, and in response to reception of the xPUSCH, generate a HARQ ACK/NACK to be carried by another xPDCCH or a 5G physical HARQ indicator channel (xPHICH).

In Example 17, the subject matter of Example 16 optionally includes, wherein at least one of: the xPDCCH and the xPUCCH are disposed at opposite ends of the current FDD subframe, the DL and UL FDD subframe are delayed relative to each other, or at least one of the DL and UL FDD subframe comprises an additional portion that is configured to be blank, that comprises data associated with the UE or another UE or that comprises at least one of a broadcast signal or control information associated with the UE.

In Example 18, the subject matter of Example 17 optionally includes, wherein: the xPDSCH is disposed in the current FDD subframe after the xPDCCH and the xPUCCH is disposed in the current FDD subframe after the xPUSCH, and a portion of the current FDD subframe after the xPDSCH overlaps with the xPUCCH, and the portion one of: is blank, comprises another xPDSCH, which is associated with a different UE, or comprises one of: a physical broadcast channel (xPBCH), a 5G primary synchronization signal (xPSS) and 5G secondary synchronization signal (xSSS), a channel state information reference signal (CSI-RS), or a 5G system information block (xSIB).

In Example 19, the subject matter of any one or more of Examples 17-18 optionally include, wherein: the xPDSCH is disposed in the current FDD subframe after the xPDCCH and the xPUCCH is disposed in the current FDD subframe after the xPDSCH, and a portion of the current FDD subframe before the xPUSCH overlaps with the xPDCCH, and the portion one of: is blank, comprises an xPUSCH associated with a different UE, or comprises a reference or control signal.

In Example 20, the subject matter of any one or more of Examples 17-19 optionally include, wherein: the xPDCCH is disposed in a portion of the current FDD subframe, the xPDSCH is disposed after the xPDCCH, and the other xPDCCH or the xPHICH is allocated in a portion of the current FDD subframe, a first xPUCCH is disposed in the portion, a second xPUCCH is disposed in the portion of the current FDD subframe and the xPUSCH is disposed between the xPUCCHs, and one of: the first xPUCCH is allocated to carry at least one of a scheduling request (SR), a channel state information (CSI) report or a periodic Buffer Status Report (BSR) report, a signal format of the first xPUCCH is different from a signal format of the second xPUCCH, and the second xPUCCH is reserved for a HARQ ACK/NACK transmission, a reference signal is disposed between at least one of: the first xPUCCH and the xPUSCH, and the xPUSCH and the second xPUCCH, or a portion of the current FDD subframe at least one of between the xPDSCH and the xPDCCH or xPHICH and between the xPUSCH and the xPUCCH is punctured or contains at least one reference or control signal.

Example 21 includes a computer-readable storage medium that stores instructions for execution by one or more processors of user equipment (UE), the one or more processors to configure the UE to at least one of: decode a 5th generation (5G) physical downlink control channel (xPDCCH) and associated 5G physical downlink shared channel (xPDSCH) within a current frequency division duplex (FDD) subframe from an evolved NodeB (eNB) and generate a Hybrid Automatic Repeat Request (HARQ) Acknowledgement (ACK)/Negative Acknowledgement (NACK) for the xPDSCH for transmission via a 5G physical uplink control channel (xPUCCH) in the current FDD subframe or in a next FDD subframe immediately following the current FDD subframe; or decode an xPDCCH within the current FDD subframe, generate a 5G physical uplink shared channel (xPUSCH) within the current FDD subframe in response to the xPDCCH and, in response to transmission of the xPUSCH, decode a HARQ ACK/NACK carried by another xPDCCH or a 5G physical HARQ indicator channel (xPHICH) in the current FDD subframe or in the next FDD subframe, wherein one of: the xPDCCH and the xPUCCH are disposed at opposite ends of the current FDD subframe, or at least one of the DL and UL FDD subframe comprises an additional portion that is configured to be blank, that comprises data associated with the UE or another UE or that comprises at least one of a broadcast signal or control information associated with the UE.

In Example 22, the subject matter of Example 21 optionally includes, wherein: the xPDSCH is disposed in the current FDD subframe after the xPDCCH and the xPUCCH is disposed in the current FDD subframe after the xPUSCH, and: at least one of a portion of the current FDD subframe after the xPDSCH overlaps with the xPUCCH or another portion of the current FDD subframe before the xPUSCH overlaps with the xPDCCH, and the portion or the other portion one of: is blank, comprises the other xPDSCH or an xPUSCH associated with a different UE, or comprises a reference or control signal.

In Example 23, the subject matter of any one or more of Examples 21-22 optionally include, wherein: the xPDCCH is disposed in a portion of the current FDD subframe, the xPDSCH is disposed after the xPDCCH, and the other xPDCCH or the xPHICH is allocated in a portion of the current FDD subframe, a first xPUCCH is disposed in the portion, a second xPUCCH is disposed in the portion of the current FDD subframe and the xPUSCH is disposed between the xPUCCHs, and one of: the first xPUCCH is allocated to carry at least one of a scheduling request (SR), a channel state information (CSI) report or a periodic Buffer Status Report (BSR) report, a signal format of the first xPUCCH is different from a signal format of the second xPUCCH, and the second xPUCCH is reserved for a HARQ ACK/NACK transmission, a reference signal is disposed between at least one of: the first xPUCCH and the xPUSCH, and the xPUSCH and the second xPUCCH, or a first xPUCCH is disposed in the initial portion, a second xPUCCH is disposed in the portion of the current FDD subframe and the xPUSCH is disposed between the xPUCCHs, and a portion of the current FDD subframe at least one of between the xPDSCH and the xPDCCH or xPHICH and between the xPUSCH and the xPUCCH is punctured or contains at least one reference or control signal.

Example 24 includes an apparatus of a user equipment (UE), the apparatus comprising at least one of: means for decoding a 5th generation (5G) physical downlink control channel (xPDCCH) and associated 5G physical downlink shared channel (xPDSCH) within a current frequency division duplex (FDD) subframe from an evolved NodeB (eNB) and generate a Hybrid Automatic Repeat Request (HARQ) Acknowledgement (ACK)/Negative Acknowledgement (NACK) for the xPDSCH for transmission via a 5G physical uplink control channel (xPUCCH) in the current FDD subframe or in a next FDD subframe immediately following the current FDD subframe; or means for decoding an xPDCCH within the current FDD subframe, generate a 5G physical uplink shared channel (xPUSCH) within the current FDD subframe in response to the xPDCCH and, in response to transmission of the xPUSCH, decode a HARQ ACK/NACK carried by another xPDCCH or a 5G physical HARQ indicator channel (xPHICH) in the current FDD subframe or in the next FDD subframe, wherein one of: the xPDCCH and the xPUCCH are disposed at opposite ends of the current FDD subframe, or at least one of the DL and UL FDD subframe comprises an additional portion that is configured to be blank, that comprises data associated with the UE or another UE or that comprises at least one of a broadcast signal or control information associated with the UE.

In Example 25, the subject matter of Example 24 optionally includes, wherein: the xPDSCH is disposed in the current FDD subframe after the xPDCCH and the xPUCCH is disposed in the current FDD subframe after the xPUSCH, and: at least one of a portion of the current FDD subframe after the xPDSCH overlaps with the xPUCCH or another portion of the current FDD subframe before the xPUSCH overlaps with the xPDCCH, and the portion or the other portion one of: is blank, comprises the other xPDSCH or an xPUSCH associated with a different UE, or comprises a reference or control signal.

In Example 26, the subject matter of any one or more of Examples 24-25 optionally include, wherein: the xPDCCH is disposed in a portion of the current FDD subframe, the xPDSCH is disposed after the xPDCCH, and the other xPDCCH or the xPHICH is allocated in a portion of the current FDD subframe, a first xPUCCH is disposed in the portion, a second xPUCCH is disposed in the portion of the current FDD subframe and the xPUSCH is disposed between the xPUCCHs, and one of: the first xPUCCH is allocated to carry at least one of a scheduling request (SR), a channel state information (CSI) report or a periodic Buffer Status Report (BSR) report, a signal format of the first xPUCCH is different from a signal format of the second xPUCCH, and the second xPUCCH is reserved for a HARQ ACK/NACK transmission, a reference signal is disposed between at least one of: the first xPUCCH and the xPUSCH, and the xPUSCH and the second xPUCCH, or a first xPUCCH is disposed in the initial portion, a second xPUCCH is disposed in the portion of the current FDD subframe and the xPUSCH is disposed between the xPUCCHs, and a portion of the current FDD subframe at least one of between the xPDSCH and the xPDCCH or xPHICH and between the xPUSCH and the xPUCCH is punctured or contains at least one reference or control signal.

Example 27 includes a method of operating a user equipment (UE), the method comprising at least one of: decoding a 5th generation (5G) physical downlink control channel (xPDCCH) and associated 5G physical downlink shared channel (xPDSCH) within a current frequency division duplex (FDD) subframe from an evolved NodeB (eNB) and generate a Hybrid Automatic Repeat Request (HARQ) Acknowledgement (ACK)/Negative Acknowledgement (NACK) for the xPDSCH for transmission via a 5G physical uplink control channel (xPUCCH) in the current FDD subframe or in a next FDD subframe immediately following the current FDD subframe; or decoding an xPDCCH within the current FDD subframe, generate a 5G physical uplink shared channel (xPUSCH) within the current FDD subframe in response to the xPDCCH and, in response to transmission of the xPUSCH, decode a HARQ ACK/NACK carried by another xPDCCH or a 5G physical HARQ indicator channel (xPHICH) in the current FDD subframe or in the next FDD subframe, wherein one of: the xPDCCH and the xPUCCH are disposed at opposite ends of the current FDD subframe, or at least one of the DL and UL FDD subframe comprises an additional portion that is configured to be blank, that comprises data associated with the UE or another UE or that comprises at least one of a broadcast signal or control information associated with the UE.

In Example 28, the subject matter of Example 27 optionally includes, wherein: the xPDSCH is disposed in the current FDD subframe after the xPDCCH and the xPUCCH is disposed in the current FDD subframe after the xPUSCH, and: at least one of a portion of the current FDD subframe after the xPDSCH overlaps with the xPUCCH or another portion of the current FDD subframe before the xPUSCH overlaps with the xPDCCH, and the portion or the other portion one of: is blank, comprises the other xPDSCH or an xPUSCH associated with a different UE, or comprises a reference or control signal.

In Example 29, the subject matter of any one or more of Examples 27-28 optionally include, wherein: the xPDCCH is disposed in a portion of the current FDD subframe, the xPDSCH is disposed after the xPDCCH, and the other xPDCCH or the xPHICH is allocated in a portion of the current FDD subframe, a first xPUCCH is disposed in the portion, a second xPUCCH is disposed in the portion of the current FDD subframe and the xPUSCH is disposed between the xPUCCHs, and one of: the first xPUCCH is allocated to carry at least one of a scheduling request (SR), a channel state information (CSI) report or a periodic Buffer Status Report (BSR) report, a signal format of the first xPUCCH is different from a signal format of the second xPUCCH, and the second xPUCCH is reserved for a HARQ ACK/NACK transmission, a reference signal is disposed between at least one of: the first xPUCCH and the xPUSCH, and the xPUSCH and the second xPUCCH, or a first xPUCCH is disposed in the initial portion, a second xPUCCH is disposed in the portion of the current FDD subframe and the xPUSCH is disposed between the xPUCCHs, and a portion of the current FDD subframe at least one of between the xPDSCH and the xPDCCH or xPHICH and between the xPUSCH and the xPUCCH is punctured or contains at least one reference or control signal.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus of user equipment (UE), the apparatus comprising:
a memory; and
processing circuitry in communication with the memory and configurable to:
decode a 5$^{th}$ generation (5G) physical downlink control channel (xPDCCH) and associated 5G physical downlink shared channel (xPDSCH) after the xPDCCH received within a current frequency division duplex (FDD) subframe from an evolved NodeB (eNB);
generate a Hybrid Automatic Repeat Request (HARQ) Acknowledgement (ACK)/Negative Acknowledgement (NACK) for the xPDSCH for transmission via a 5G physical uplink control channel (xPUCCH) in the current FDD subframe;
generate in response to the xPDCCH a 5G physical uplink shared channel (xPUSCH) within the current FDD subframe before the xPUCCH; and
in response to transmission of the xPUSCH, decode a HARQ ACK/NACK carried by another xPDCCH or a 5G physical HARQ indicator channel (xPHICH) in the current FDD subframe or in the next FDD subframe,
wherein a portion of the current FDD subframe before or after the xPDSCH comprises symbols that overlap in time with the xPUCCH such that the xPUCCH fully overlaps the portion, and
if the portion of the current FDD subframe after the xPDSCH comprises symbols that overlap in time with the xPUCCH, for self-contained DL transmission the portion is one of:
punctured or blanked, or
comprises one of: a physical broadcast channel (xPBCH), a 5G primary synchronization signal (xPSS) and 5G secondary synchronization signal (xSSS), a channel state information reference signal (CSI-RS), or a 5G system information block (xSIB).

2. The apparatus of claim 1, wherein:
the portion of the current FDD subframe after the xPDSCH comprises symbols that overlap in time with the xPUCCH.

3. The apparatus of claim 1, wherein:
a portion of the current FDD subframe after the xPDSCH comprises the other xPDSCH, which is associated with one of the UE or a different UE.

4. The apparatus of claim 1, wherein:
the portion of the current FDD subframe before the xPUSCH comprises symbols that overlap in time with the xPDCCH, and
for self-contained UL transmission the portion is punctured, blanked or comprises a reference or control signal from the UE.

5. The apparatus of claim 1, wherein:
a portion of the current FDD subframe before the xPUSCH comprises another xPUSCH associated with one of the UE or a different UE.

6. The apparatus of claim 1, wherein:
for self-contained downlink (DL) and uplink (UL) transmission, the xPUCCH and xPUSCH is delayed relative to the xPDCCH and xPDSCH, and an amount of delay is a parameter that is fixed by a Third Generation Partnership Project (3GPP) specification or configurable on a cell-by-cell basis via a 5G master information block (xMIB), a 5G system information block (xSIB) or a Radio Resource Control (RRC) signaling.

7. The apparatus of claim 1, wherein:
the other xPDCCH or the xPHICH is allocated in a portion of the current FDD subframe, and
a first xPUCCH is disposed in the portion of the current FDD subframe, a second xPUCCH is disposed in the portion of the current FDD subframe and the xPUSCH is disposed between the first xPUCCH and the second xPUCCH.

8. The apparatus of claim 7, wherein:
the first xPUCCH is allocated to carry at least one of a scheduling request (SR), a channel state information (CSI) report or a periodic Buffer Status Report (BSR) report.

9. The apparatus of claim 7, wherein:
a signal format of the first xPUCCH is different from a signal format of the second xPUCCH, and
the second xPUCCH is reserved for a HARQ ACK/NACK transmission.

10. The apparatus of claim 7, wherein:
a sounding reference signal (SRS) is disposed between at least one of:
the first xPUCCH and the xPUSCH, and
the xPUSCH and the second xPUCCH.

11. The apparatus of claim 7, wherein:
a portion of the current FDD subframe at least one of between the xPDSCH and the xPDCCH or xPHICH and between the xPUSCH and the xPUCCH is punctured or contains at least one reference or control signal.

12. The apparatus of claim 1, wherein:
the processing circuitry comprises baseband circuitry configured to determine at least one of a number of symbols allocated for the xPDCCH or xPUCCH or a starting and last symbol for the xPDSCH or xPUSCH, and
at least one of:
    the number of symbols is one of:
        predefined in a Third Generation Partnership Project (3GPP) specification,
        configured by higher layer signaling via a 5G master information block (xMIB), a 5G system information block (xSIB) or a Radio Resource Control (RRC) signaling, or
        dynamically indicated in a 5G physical control frame indicator channel (xPCFICH), and
    the starting and last symbol is one of:
        semi-statically configured by higher layers via the xMIB, the xSIB or the RRC signaling, or
        dynamically indicated in downlink control information (DCI) for a downlink or uplink grant.

13. The apparatus of claim 1, further comprising:
an antenna configured to provide communications between the UE and the eNB.

14. An apparatus of an evolved NodeB (eNB) comprising:
a memory; and
processing circuitry in communication with the memory and configurable to:
within a current frequency division duplex (FDD) subframe:
    generate, for transmission to a user equipment (UE), a 5$^{th}$ generation (5G) (xPDCCH) and associated 5G physical downlink shared channel (xPDSCH), and
    decode a 5G physical uplink shared channel (xPUSCH) of an uplink (UL) FDD subframe in response to transmission of the xPDCCH, the UL FDD subframe comprising a 5G physical uplink control channel (xPUCCH) and the xPUSCH, and
within at most one FDD subframe from the current FDD subframe:
    decode a Hybrid Automatic Repeat Request (HARQ) Acknowledgement (ACK)/Negative Acknowledgement (NACK) for the xPDSCH from the xPUCCH, and
    in response to reception of the xPUSCH, generate a HARQ ACK/NACK to be carried by another xPDCCH or a 5G physical HARQ indicator channel (xPHICH),
wherein at least one of:
    the xPDCCH and the xPUCCH are disposed at opposite ends of the current FDD subframe,
    the DL and UL FDD subframe are delayed relative to each other, or
    at least one of the DL and UL FDD subframe comprises an additional portion that is configured to be blank, that comprises data associated with the UE or another UE or that comprises at least one of a broadcast signal or control information associated with the UE,
    the xPDSCH is disposed in the current FDD subframe after the xPDCCH and the xPUCCH is disposed in the current FDD subframe after the xPUSCH,
    a portion of the current FDD subframe before or after the xPDSCH overlaps with the xPUCCH, and
    if the portion after the xPDSCH overlaps with the xPUCCH, the portion one of: is blank, comprises another xPDSCH, which is associated with a different UE, or comprises one of: a physical broadcast channel (xPBCH), a 5G primary synchronization signal (xPSS) and 5G secondary synchronization signal (xSSS), a channel state information reference signal (CSI-RS), or a 5G system information block (xSIB).

15. The apparatus of claim 14, wherein:
the portion of the current FDD subframe after the xPDSCH overlaps with the xPUCCH.

16. The apparatus of claim 14, wherein:
the portion of the current FDD subframe before the xPUSCH overlaps with the xPDCCH, and
the portion one of: is blank, comprises an xPUSCH associated with a different UE, or comprises a reference or control signal.

17. The apparatus of claim 14, wherein:
the other xPDCCH or the xPHICH is allocated in another portion of the current FDD subframe,
a first xPUCCH and a second xPUCCH are disposed in the current FDD subframe and the xPUSCH is disposed between the first xPUCCH and the second xPUCCH, and one of:
    the first xPUCCH is allocated to carry at least one of a scheduling request (SR), a channel state information (CSI) report or a periodic Buffer Status Report (BSR) report,
    a signal format of the first xPUCCH is different from a signal format of the second xPUCCH, and the second xPUCCH is reserved for a HARQ ACK/NACK transmission,
    a reference signal is disposed between at least one of: the first xPUCCH and the xPUSCH, and the xPUSCH and the second xPUCCH, or
    a portion of the current FDD subframe at least one of between the xPDSCH and the xPDCCH or xPHICH and between the xPUSCH and the xPUCCH is punctured or contains at least one reference or control signal.

18. A computer-readable storage medium that stores instructions for execution by one or more processors of user equipment (UE), the one or more processors to configure the UE to at least one of:
decode a 5$^{th}$ generation (5G) physical downlink control channel (xPDCCH) and associated 5G physical downlink shared channel (xPDSCH) within a current frequency division duplex (FDD) subframe from an evolved NodeB (eNB) and generate a Hybrid Automatic Repeat Request (HARQ) Acknowledgement (ACK)/Negative Acknowledgement (NACK) for the xPDSCH for transmission via a 5G physical uplink control channel (xPUCCH) in the current FDD subframe or in a next FDD subframe immediately following the current FDD subframe; or
decode an xPDCCH within the current FDD subframe, generate a 5G physical uplink shared channel (xPUSCH) within the current FDD subframe in response to the xPDCCH and, in response to transmission of the xPUSCH, decode a HARQ ACK/NACK carried by another xPDCCH or a 5G physical HARQ indicator channel (xPHICH) in the current FDD subframe or in the next FDD subframe,
wherein one of: the xPDCCH and the xPUCCH are disposed at opposite ends of the current FDD subframe, or at least one of the DL and UL FDD subframe comprises an additional portion that is configured to be blank, that comprises data associated with the UE or another UE or that comprises at least one of a broadcast signal or control information associated with the UE, and
wherein the xPDSCH is disposed in the current FDD subframe after the xPDCCH and the xPUCCH is disposed in the current FDD subframe after the xPUSCH, and:
  at least one of a portion of the current FDD subframe after the xPDSCH overlaps with the xPUCCH or another portion of the current FDD subframe before the xPUSCH overlaps with the xPDCCH, and
  the portion or the other portion one of: is blank, comprises the other xPDSCH or an xPUSCH associated with a different UE, or comprises a reference or control signal.

19. The medium of claim 18, wherein:
a first xPUCCH is disposed in a portion of the current FDD subframe, a second xPUCCH is disposed in the portion of the current FDD subframe and the xPUSCH is disposed between the first and second xPUCCHs, and one of:
the first xPUCCH is allocated to carry at least one of a scheduling request (SR), a channel state information (CSI) report or a periodic Buffer Status Report (BSR) report,
a signal format of the first xPUCCH is different from a signal format of the second xPUCCH, and the second xPUCCH is reserved for a HARQ ACK/NACK transmission,
a reference signal is disposed between at least one of: the first xPUCCH and the xPUSCH, and the xPUSCH and the second xPUCCH, or
a first xPUCCH is disposed in the initial portion, a second xPUCCH is disposed in the portion of the current FDD subframe and the xPUSCH is disposed between the xPUCCHs, and a portion of the current FDD subframe at least one of between the xPDSCH and the xPDCCH or xPHICH and between the xPUSCH and the xPUCCH is punctured or contains at least one reference or control signal.

* * * * *